(12) United States Patent
Ota et al.

(10) Patent No.: US 10,416,659 B2
(45) Date of Patent: Sep. 17, 2019

(54) PLANT EQUIPMENT STATE GATHERING SYSTEM

(71) Applicant: NIPPON SEIKI CO., LTD., Niigata (JP)

(72) Inventors: Satoshi Ota, Niigata (JP); Hideki Masuda, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 164 days.

(21) Appl. No.: 15/546,052

(22) PCT Filed: Dec. 22, 2015

(86) PCT No.: PCT/JP2015/085819
§ 371 (c)(1),
(2) Date: Jul. 25, 2017

(87) PCT Pub. No.: WO2016/121271
PCT Pub. Date: Aug. 4, 2016

(65) Prior Publication Data
US 2018/0246499 A1      Aug. 30, 2018

(30) Foreign Application Priority Data
Jan. 27, 2015   (JP) ................................. 2015-013049

(51) Int. Cl.
*G06F 3/00*    (2006.01)
*G05B 19/418*  (2006.01)
(Continued)

(52) U.S. Cl.
CPC ... *G05B 19/41855* (2013.01); *G05B 19/0425* (2013.01); *G05B 19/41845* (2013.01);
(Continued)

(58) Field of Classification Search
CPC .......... G05B 19/41855; G05B 19/0425; G05B 19/41845; G05B 2219/23406;
(Continued)

(56) References Cited

U.S. PATENT DOCUMENTS

2009/0227282 A1   9/2009  Miyabayashi et al.
2010/0290351 A1*  11/2010 Toepke .............. G05B 19/4185
                                                        370/250
(Continued)

FOREIGN PATENT DOCUMENTS

CN        201556070 U  *  8/2010
CN        201774315 U  *  3/2011
(Continued)

OTHER PUBLICATIONS

International Search Report issued in Application No. PCT/JP2015/085819 dated Apr. 6, 2016, with English translation.
(Continued)

*Primary Examiner* — Jing-Yih Shyu
(74) *Attorney, Agent, or Firm* — McDermott Will & Emery LLP

(57) ABSTRACT

Provided is a plant equipment state gathering system which simplifies the work relating to attaching and/or replacing a detection device that detects the state of plant equipment. A plant equipment state gathering system is provided with a detection device, a mobile terminal, a network construction device and a data storage device. The detection device includes a tag unit that can store, in a non-contact manner, at least some setting information that at least includes network information for connecting to the network from the mobile terminal. The mobile terminal includes a tag control unit that allows the tag unit of the detection device to automatically store, in a non-contact manner, at least some of the setting information. When network information is
(Continued)

stored in the tag unit of the detection device by the mobile terminal the network construction device uses this network information to determine whether to allow the connection of the detection device to the network.

7 Claims, 26 Drawing Sheets

(51) Int. Cl.
  *G06Q 50/04* (2012.01)
  *G05B 19/042* (2006.01)

(52) U.S. Cl.
  CPC ... *G06Q 50/04* (2013.01); *G05B 2219/23406* (2013.01); *G05B 2219/25428* (2013.01); *G05B 2219/31151* (2013.01); *G05B 2219/31197* (2013.01); *Y02P 80/114* (2015.11); *Y02P 90/10* (2015.11); *Y02P 90/16* (2015.11); *Y02P 90/185* (2015.11)

(58) Field of Classification Search
  CPC .......... G05B 2219/31197; G05B 2219/31151; G05B 2219/25428; Y02P 90/185; Y02P 90/10; Y02P 80/114; Y02P 90/16; G06Q 50/04
  See application file for complete search history.

(56) References Cited

U.S. PATENT DOCUMENTS

| | | | |
|---|---|---|---|
| 2011/0205944 A1 | 8/2011 | Miyabayashi et al. | |
| 2013/0332383 A1 | 12/2013 | Anzai et al. | |

FOREIGN PATENT DOCUMENTS

| | | | | |
|---|---|---|---|---|
| DE | 102014103426 A1 | 9/2014 | | |
| GB | 2513457 A | 10/2014 | | |
| JP | 07-035880 B2 | 4/1995 | | |
| JP | 2001-125633 A | 5/2001 | | |
| JP | 2008-312047 A | 12/2008 | | |
| JP | 2009-075941 A | 4/2009 | | |
| JP | 2009-211433 A | 9/2009 | | |
| JP | 2009-218845 A | 9/2009 | | |
| JP | 2011-086012 A | 4/2011 | | |
| JP | 2012-150686 A | 8/2012 | | |
| JP | 2013-008234 A | 1/2013 | | |
| JP | 2014-081806 A | 5/2014 | | |
| WO | 2012016014 A1 | 2/2012 | | |
| WO | WO-2012016014 A1 | * | 2/2012 | .......... G05B 19/042 |
| WO | 2014094982 A1 | 6/2014 | | |
| WO | WO-2014094982 A1 | * | 6/2014 | ........ H04L 41/0806 |
| WO | 2015/186227 A1 | 12/2015 | | |

OTHER PUBLICATIONS

Extended European Search Report issued in corresponding European Patent Application No. 15880163.9-1204, dated Sep. 10, 2018.

* cited by examiner

FIG.2B

NETWORK CONSTRUCTION INFORMATION (DATA 001)

| | | |
|---|---|---|
| | SENSOR ID | CONNECTED STATE |
| | SENSOR ID | CONNECTED STATE |
| NETWORK ID | ⋮ | ⋮ |
| | REPEATER ID | CONNECTED STATE |
| | ⋮ | ⋮ |

PLANT INFORMATION (DATA 002)

| | SENSOR ID | CONNECTED STATE | SM ATTACHMENT INFORMATION · ATTACHMENT AREA · ATTACHMENT EQUIPMENT | SM OPERATION CONDITION · DETECTION ITEMS | STATES OF PLANT EQUIPMENT | DETECTED VALUE |
|---|---|---|---|---|---|---|
| NETWORK ID | ⋮ | ⋮ | ⋮ | ⋮ | ⋮ | ⋮ |
| | REPEATER ID | CONNECTED STATE | REPEATER ATTACHMENT INFORMATION · ATTACHMENT AREA | | | |
| | ⋮ | ⋮ | ⋮ | | | |
| NETWORK ID | SENSOR ID | CONNECTED STATE | SM ATTACHMENT INFORMATION · ATTACHMENT AREA · ATTACHMENT EQUIPMENT | SM OPERATION CONDITION · DETECTION ITEMS | STATES OF PLANT EQUIPMENT | DETECTED VALUE |
| | ⋮ | ⋮ | ⋮ | ⋮ | ⋮ | ⋮ |
| | REPEATER ID | CONNECTED STATE | REPEATER ATTACHMENT INFORMATION · ATTACHMENT AREA | | | |
| | ⋮ | ⋮ | ⋮ | | | |
| ⋮ | ⋮ | ⋮ | ⋮ | ⋮ | ⋮ | ⋮ |

FIG.3B

DATA 101

| SENSOR ID | DETECTED VALUE |
|---|---|

DATA 102

| NETWORK ID | SENSOR ID | DETECTED VALUE |
|---|---|---|
| | SENSOR ID | DETECTED VALUE |
| | ⋮ | ⋮ |

FIG.4B

DATA 201

| NETWORK INFORMATION · NETWORK ID · NETWORK PASSWORD | SM ATTACHMENT INFORMATION · ATTACHMENT AREA · ATTACHMENT EQUIPMENT | SM OPERATION CONDITION · DETECTION INTERVAL · DETECTION ITEMS |
|---|---|---|

DATA 203

| NETWORK INFORMATION · NETWORK ID · NETWORK PASSWORD | SM OPERATION CONDITION · DETECTION INTERVAL · DETECTION ITEMS |
|---|---|

DATA 204

| SENSOR ID | SM ATTACHMENT INFORMATION · ATTACHMENT AREA · ATTACHMENT EQUIPMENT | SM OPERATION CONDITION · DETECTION ITEMS |
|---|---|---|

DATA 207

| SENSOR ID | NETWORK INFORMATION · NETWORK ID · NETWORK PASSWORD |
|---|---|

DATA 305

FIG.6B

DATA 401

| NETWORK INFORMATION<br><br>·NETWORK ID<br>·NETWORK PASSWORD | REPEATER ATTACHMENT INFORMATION<br><br>·ATTACHMENT AREA |
|---|---|

DATA 403

| NETWORK INFORMATION<br><br>·NETWORK ID<br>·NETWORK PASSWORD |
|---|

DATA 404

| REPEATER ID | REPEATER ATTACHMENT INFORMATION<br><br>·ATTACHMENT AREA |
|---|---|

DATA 407

| REPEATER ID | NETWORK INFORMATION<br><br>·NETWORK ID<br>·NETWORK PASSWORD |
|---|---|

DATA 506

| SENSOR ID | WORK CONTENTS | STATES OF PLANT EQUIPMENT |
|---|---|---|

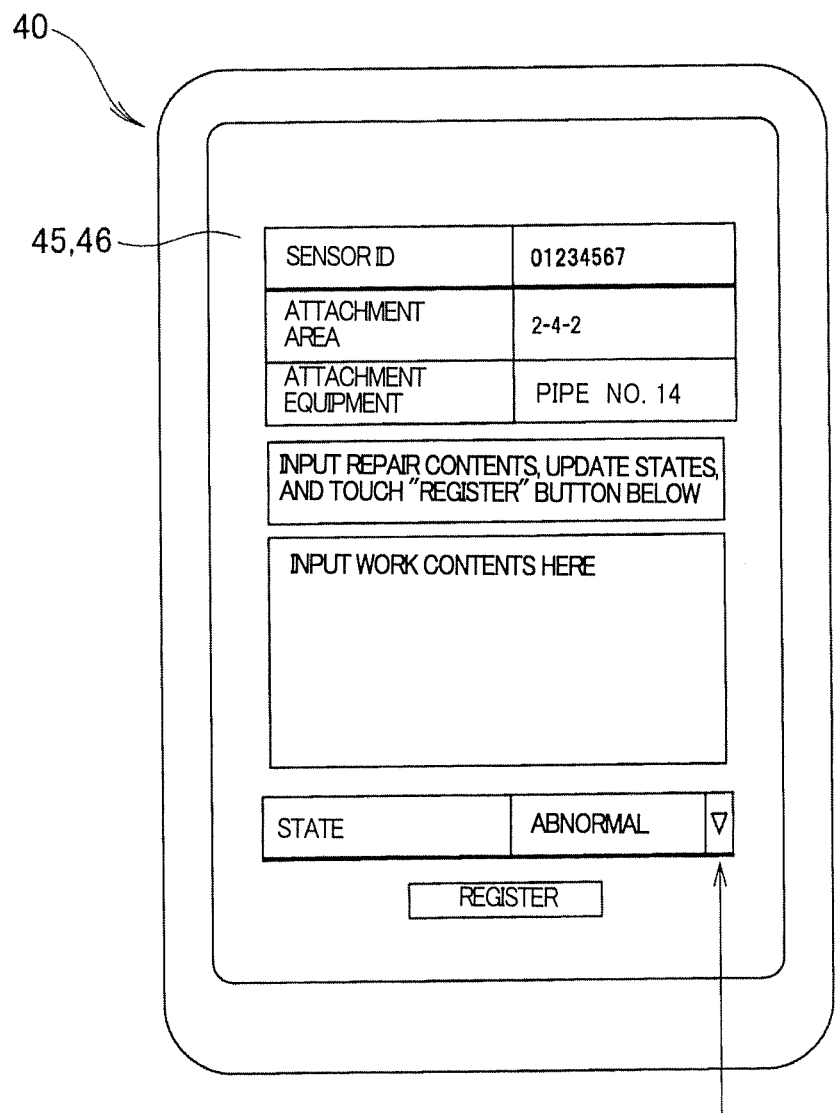

PLANT EQUIPMENT STATE GATHERING SYSTEM

RELATED APPLICATIONS

This application is the U.S. National Phase under 35 U.S.C. § 371 of International Application No. PCT/JP2015/085819, filed on Dec. 22, 2015, which in turn claims the benefit of Japanese Application No. 2015-013049, filed on Jan. 27, 2015, the disclosures of which are incorporated by reference herein.

TECHNICAL FIELD

The present invention relates to a plant equipment state gathering system. More particularly, the present invention relates to a plant equipment state gathering system which simplifies work relating to attaching and replacing of a detection device that detects a state of plant equipment.

BACKGROUND ART

Patent Literature 1 discloses a wireless remote operation determination device of a steam trap (a plant equipment state gathering system), for example. The plant equipment state gathering system described in Patent Literature 1 detects temperature, vibration, and so forth associated with an operation of a steam trap which is one of the plant equipment, and determines quality of an operating state of the steam trap. The plant equipment state gathering system described in Patent Literature 1 includes a transmission device (a detection device) which has a transmission band width matched with the steam trap on a one-on-one basis and is attached to the steam trap, and an operation determination device having a reception device of which receiving band width is variable.

A detection device of the plant equipment state gathering system described in Patent Literature 1 is provided with a storage unit storing specifying information, measurement condition, and so forth of the attached steam trap, and transmits detected data of temperature and vibration of the steam trap together with the specifying information, the measurement condition, and so forth. The operation determination device of the plant equipment state gathering system described in Patent Literature 1 can receive temperature, vibration, specifying information, measurement condition, and so forth of the steam trap transmitted from the detection device when the receiving band width is adjusted to the transmitting band width provided in the detection device. The operation determination device of the plant equipment state gathering system described in Patent Literature 1 can determine an operating state of the steam trap based on the received temperature, vibration, specifying information, measurement condition, and so forth of the steam trap.

Therefore, in the plant equipment state gathering system described in Patent Literature 1, it is unnecessary for an operator to bring the operation determination device into direct contact with the steam trap to detect temperature, vibration, and so forth of the steam trap. Further, it is unnecessary for the operator to input specifying information, measurement condition, and so forth of the steam trap of an operation determination target into an operation determination device each time operation determination of the steam trap is performed. Therefore, the plant equipment state gathering system described in Patent Literature 1 can reduce an effort of the operator relating to the operation determination of the steam trap.

CITATION LIST

Patent Literature

Patent Literature 1: Japanese Unexamined Patent Application Publication No. 7-35880
Patent Literature 2: Japanese Patent Application Publication No. 2011-86012

SUMMARY OF THE INVENTION

Problems to be Solved by the Invention

In the plant equipment state gathering system described in Patent Literature 1, when making operation determination of a steam trap of measurement target, the operator needs to adjust the receiving band width of the reception unit of the operation determination device to a specific transmitting band width correlated with a desired steam trap. Further, in the plant equipment state gathering system, the operator needs to carry the operation determination device when moving around so that the operation determination device is in an area in which data transmitted by the detection device attached to the steam trap of measurement target is receivable. Then, in the plant equipment state gathering system described in Patent Literature 1, it is assumed that a steam trap of which operating state is an abnormal state cannot be found promptly. It is assumed that this issue may become more significant as the plant significantly increases in size, or increases in number of plant equipment.

To resolve this issue, a plurality of detection devices may be connected using a wireless network, for example. Operating states of a plurality of steam traps can be determined simultaneously without adjustment of the receiving band width of the reception unit of the operation determination device for each steam trap of measurement target by connecting a plurality of detection devices using a wireless network. A concept of connecting plant equipment using a wireless network is disclosed in Patent Literature 2.

Generally, authentication with network information, such as a network ID, a password, and so forth, is needed for a connection to a wireless network in order to prevent unauthorized connection by a third party, for example. Therefore, an operator needs to set network information to a detection device connected to the wireless network. If the detection device includes a display unit, such as a display device, and an input unit, such as a keyboard, the operator can set network information using the display unit, the input unit, and so forth.

However, it is assumed that the detection device is not provided with a display unit, an input unit, and so forth to prevent an increase in size of the detection device, for example. If the detection device is not provided with a display unit, an input unit, and so forth, a method for wiredly connecting another device having a display unit, an input unit, and so forth (a setting device) to the detection device, and setting network information is employable. If this method is employed, since work of connecting a cable of the setting device, and so forth, to a terminal of the detection device and work of replacing the cable is required, work of setting network information to the detection device becomes complicated, whereby the entire work of attaching the detection device to the plant equipment becomes complicated. Since it is necessary to set network information to a new detection device also when replacing a detection device, work of replacing the detection device also becomes complicated. Therefore, the work of attaching and replacing the detection device of the plant equipment state gathering system can be improved. In addition, another method for wirelessly connecting the setting device to the detection device to set network information is considered. If this another method is employed, an enough amount of standby power of the detection device is required to keep the wireless connection effective. Further, if a plurality of detection devices are to be prepared, work of specifying a desired detection device from among a plurality of detection devices by an operator is required. Also in this another method, similarly, the work of attaching and replacing the detection device of the plant equipment state gathering system can be improved.

An object of the present invention is to provide a plant equipment state gathering system which simplifies work relating to attaching and/or replacing of a detection device that detects a state of plant equipment. Other objects of the present invention become obvious to those skilled in the art by referring to the aspects, desirable embodiments, and attached drawings provided below.

Means for Solving the Problem

A first aspect in accordance with the present invention relates to a plant equipment state gathering system which includes a detection device, a mobile terminal, a network construction device, and a data storage device, wherein the detection device includes a detection unit detecting a state of plant equipment disposed in a plant, a network connection unit connectable to a network constructed by the network construction device, and a tag unit contactlessly storable at least a part of setting information at least including network information for connecting to the network from the mobile terminal, and at least transmits the state of the plant equipment detected by the detection unit and specifying information for specifying the detection device to the network construction device via the network, the mobile terminal includes a tag control unit capable of contactlessly and automatically storing at least a part of the setting information in the tag unit of the detection device, and is configured to be able to communicate with the data storage device, the data storage device includes a storage unit at least storing the state of the plant equipment received from the network construction device, and the specifying information of the detection device, and when the network information is stored in the tag unit of the detection device by the mobile terminal, the network construction device uses the network information to determine whether to allow a connection of the detection device to the network.

In the plant equipment state gathering system, an operator can contactlessly and automatically store the network information input into the mobile terminal in the detection device. That is, for example, it is unnecessary for the operator to operate for storing the network information in the detection device with respect to the mobile terminal wiredly connected to the detection device. Therefore, since the operator does not need to do the work of connecting and replacing the cable and so forth which connects the detection device with the mobile terminal, the work of attaching the detection device to the plant equipment can be simplified.

In the second aspect in accordance with the present invention, in the first aspect, the tag unit of the detection device stores the specifying information of the detection device including the tag unit in advance, the tag control unit of the mobile terminal is capable of contactlessly acquiring the specifying information stored in the tag unit, and after acquiring the specifying information from the tag unit by the tag control unit, the mobile terminal may store at least a part of the setting information in the tag unit by the tag control unit.

The mobile terminal can contactlessly and automatically acquire specifying information of the detection device stored in the tag unit of the detection device. Therefore, since it is unnecessary for the operator to manually input specifying information of the detection device into the mobile terminal, for example, occurrence of erroneous input (error) of specifying information of the detection device can be prevented. Further, for example, it is unnecessary for the mobile terminal to hold a plurality of pieces of specifying information corresponding to a plurality of detection devices, for example, and it is unnecessary for the operator to operate the mobile terminal wirelessly connected to detection devices and to specify a desired detection device. The operator can reliably acquire specifying information of a desired detection device only by a contactless work with a mobile terminal and a desired detection terminal.

In the third aspect in accordance with the present invention, in the first or the second aspect, when at least a part of the setting information is stored in the tag unit of the detection device by the tag control unit, the mobile terminal may transmits at least a part of the specifying information and the setting information to the data storage device.

The mobile terminal transmits at least a part of the specifying information of the detection device and the setting information to the data storage device when the network information is stored in the tag unit of the detection device by the mobile terminal. The operator can check whether the detection device attached to the plant equipment has been connected to the network on the mobile terminal by making these pieces of information received by the data storage device reflected on the storage unit of the data storage device.

In the fourth aspect in accordance with the present invention, in any of the first to the third aspects, the detection device may be powered on when the network information is stored in the tag unit of the detection device by the mobile terminal.

The detection device is set to a power on state (including a restoration state from a sleep state or an idle state) when the network information input into the mobile terminal is stored in the tag unit of the detection device. Therefore, since it is unnecessary that the detection device stands by in a power on state even if standby time until the detection device is connected to the network after being attached to the plant equipment is long, power consumption can be reduced. Further, since it is unnecessary for the operator to operate a power switch of the detection device and so forth to set the detection device to a power on state, work of attaching the detection device to the plant equipment can be simplified.

In the fifth aspect in accordance with the present invention, in any of the first to the fourth aspects, the detection device may further include a report unit, when the state of the plant equipment stored in the data storage device is an abnormal state, the data storage device may transmit an abnormal state occurrence signal including the specifying information of the detection device which detected the state of the plant equipment in the abnormal state to the network construction device, the network construction device may transmit a report signal to the detection device which has the received specifying information, and the detection device which received the report signal may start the report unit.

When an abnormal state occurs in the states of the plant equipment, the report unit of the detection device is started. Therefore, the operator can easily find the plant equipment in which an abnormal state is occurring.

In the sixth aspect in accordance with the present invention, in any of the second to the fourth aspects, when the state of the plant equipment stored in the data storage device is an abnormal state, the data storage device may transmit an abnormal state occurrence signal including the specifying information of the detection device which detected the state of the plant equipment in the abnormal state to the mobile terminal, and after receiving the abnormal state occurrence signal, the mobile terminal may determine, by the tag control unit, whether specifying information of the detection device acquired from a tag unit of the detection device and specifying information included in the abnormal state occurrence signal match each other.

In the sixth aspect, the data storage device transmits an abnormal state occurrence signal to the mobile terminal when an abnormal state occurs in the states of the plant equipment. Therefore, the operator carrying the mobile terminal can promptly recognize that an abnormal state has occurred in the states of the plant equipment.

In the seventh aspect in accordance with the present invention, in the sixth aspect, the detection device may further include a report unit, when the state of the plant equipment stored in the data storage device is the abnormal state, the data storage device may transmit the abnormal state occurrence signal including the specifying information of the detection device which has detected the state of the plant equipment in the abnormal state to the network construction device, the network construction device may transmit a report signal to the detection device which has the received specifying information, and the detection device which received the report signal may start the report unit.

In the seventh aspect, when an abnormal state occurs in the states of the plant equipment, the report unit of the detection device is started. Therefore, the operator can easily find the plant equipment in which an abnormal state is occurring.

In the eighth aspect in accordance with the present invention, in any of the first to the seventh aspects, the mobile terminal is capable of acquiring current position information of the mobile terminal, and the acquired position information may be included in the setting information as a position at which the detection device is disposed.

Since the mobile terminal includes the current position of the acquired mobile terminal in the setting information as the position at which the detection device is located, it is unnecessary for the operator to manually input the position at which the detection device is attached into the setting information.

BRIEF DESCRIPTION OF THE DRAWINGS

FIG. 2B is a diagram illustrating an example of a data structure of network construction information stored in a network construction device illustrated in FIG. 1 and an example of a data structure of plant information stored in a data storage device illustrated in FIG. 1.

FIG. 3B is a diagram illustrating an example of a data structure used in the operation illustrated in FIG. 3A.

FIG. 4B is a diagram illustrating an example of a data structure used in the work illustrated in FIG. 4A.

FIG. 6B is a diagram illustrating an example of a data structure used in the work illustrated in FIG. 6A.

FIG. 7G is a diagram illustrating a display example of the display unit of the mobile terminal illustrated in FIG. 1 in the operation illustrated in FIG. 7A.

MODE FOR CARRYING OUT THE INVENTION

Desirable embodiments described hereinafter are given for easy understanding of the present invention. Therefore, it should be understood by those skilled in the art that the present invention is not unfairly limited by the embodiments described hereinafter.

1. Entire Configuration

Figure 1:
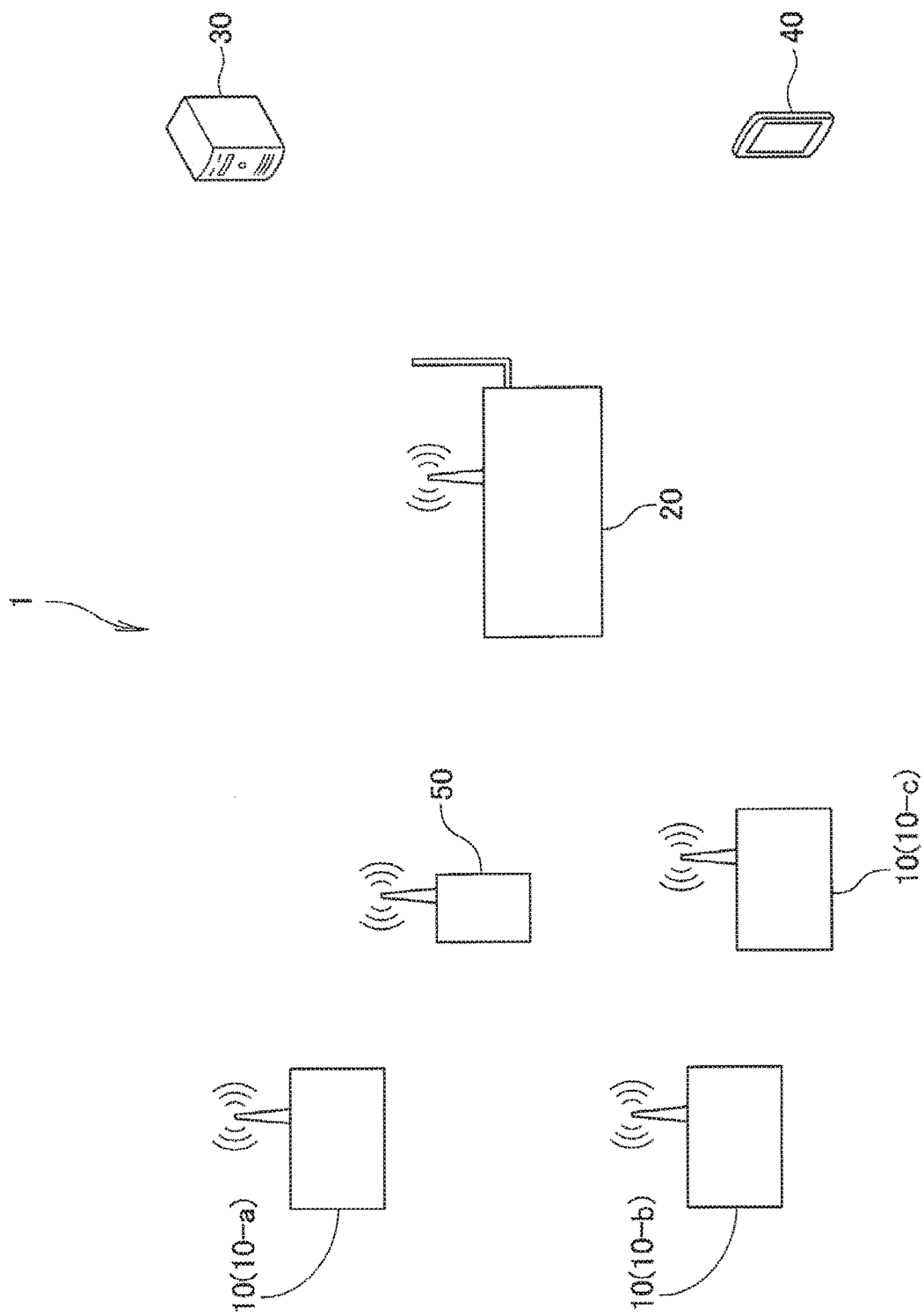
FIG. 1 is a diagram illustrating an example of an entire configuration of a plant equipment state gathering system of the present invention.

As illustrated in FIG. 1, a plant equipment state gathering system 1 is provided with a detection device 10, a network construction device 20, a data storage device 30, and a mobile terminal 40. A plurality of detection devices 10 are provided, and each of the detection devices 10 is attached to corresponding plant equipment among a plurality of pieces of plant equipment disposed in an unillustrated plant. A plurality of detection devices 10 may be connected to a wireless sensor network (WSN) based on the standards of a wireless LAN (local area network) and ZigBee (registered trademark) constructed by the network construction device 20, for example. The WSN is desirably a mesh type network. That is, a plurality of detection devices 10 desirably connect to the network construction device 20, and each detection device 10 (for example, a detection device 10-b) desirably connects also to one or a plurality of other adjoining detection devices 10 (for example, detection devices 10-a and detection device 10-c). If there is a detection device 10 that cannot connect directly to the WSN because, for example, it is located at a long distance from the network construction device 20 (for example, the detection device 10-a), the plant equipment state gathering system 1 may further include a repeater 50 and may interpolate a connectable range of the WSN.

The network construction device 20 is configured to be able to use a mobile communication, such as 3G line or LTE (Long Term Evolution) line. Hereinafter, the "mobile communication, such as 3G line or LTE line," is also referred to as "3G/LTE." The network construction device 20 is configured to be able to communicate with the data storage device 30 via the 3G/LTE.

Although three detection devices 10-a, 10-b, and 10-c are illustrated to be connected to the WSN constructed by the network construction device 20 in the example illustrated in FIG. 1, the number of the detection devices 10 connected to the WSN may be four or more, or may be one or two. In an actual plant equipment state gathering system 1, a plurality of network construction devices (the network construction device 20 of FIG. 1 and one or a plurality of unillustrated other network construction devices) are provided. A plurality of unillustrated detection devices are connected to the one or a plurality of unillustrated other network construction devices in the same manner as in FIG. 1.

Figure 2A:
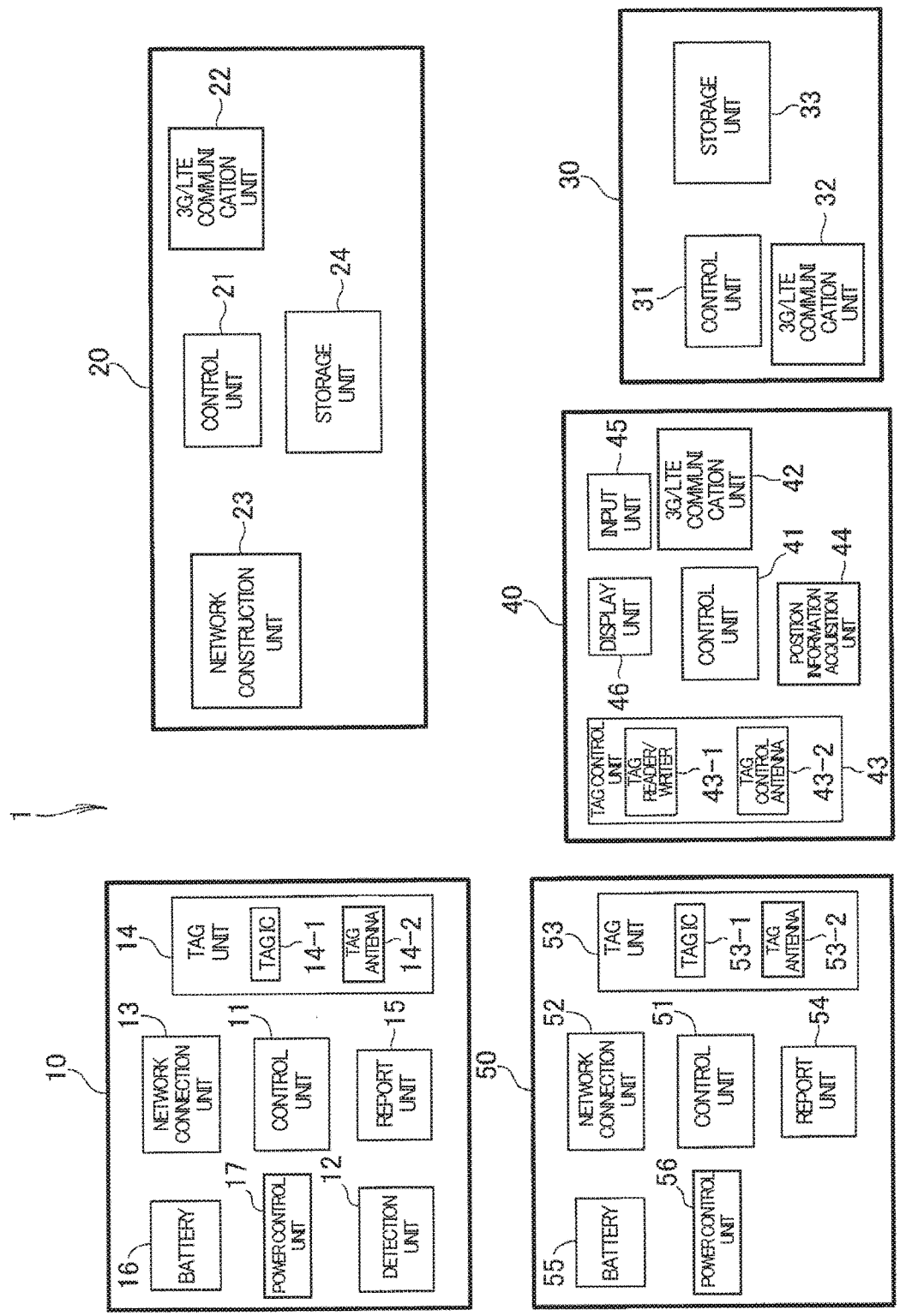
FIG. 2A is a diagram illustrating an example of an internal structure of each component of the plant equipment state gathering system illustrated in FIG. 1.

FIG. 2A illustrates an example of an internal configuration of each component of the plant equipment state gathering system 1 illustrated in FIG. 1. The detection device 10 illustrated in FIG. 2A includes a control unit 11, a detection unit 12, a network connection unit 13, a tag unit 14, and a report unit 15. Since the detection device 10 is assumed to be attached to a position at which power is difficult to be supplied with an unillustrated power cable and so forth, the detection device 10 desirably further includes a battery 16. The detection device 10 may further include a power control unit 17 for controlling power supply from a power cable or the battery 16 to at least one of the control unit 11, the detection unit 12, the network connection unit 13, the tag unit 14, and the report unit 15, for example. The power control unit 17 is provided with a self-hold circuit which has a switching element, such as a relay sequence or a transistor, for example. Hereinafter, the "detection device 10" is also referred to as a "sensor module 10."

The control unit 11 of the detection device 10 controls operations of the detection unit 12, the network connection unit 13, the tag unit 14, and the report unit 15, for example. The control unit 11 may be configured to be able to acquire a remaining amount of the battery 16, for example. The detection unit 12 of the detection device 10 detects a state of the plant equipment to which the detection device 10 is attached. Here, the plant equipment is a steam trap, a rotating machine, and so forth, and the state of the plant equipment is temperature, vibration, humidity, pressure, ph, and so forth of the plant equipment.

The network connection unit 13 of the detection device 10 is configured to be able to connect to the WSN constructed by the network construction device 20. The tag unit 14 of the detection device 10 is a RF (Radio Frequency) tag which has a tag IC 14-1 and a tag antenna 14-2 used for NFC (Near Field Communication), for example. The tag unit 14 is configured such that a later-described tag control unit 43 of the mobile terminal 40 can store information by contactlessly writing in the tag IC 14-1, for example, and can acquire information stored in the tag IC 14-1 by reading contactlessly, for example. Here, "contactless" means that the tag unit 14 of the detection device 10 and the tag control unit 43 of the mobile terminal 40 are not in direct or indirect mechanical contact by wiredly connecting the tag unit 14 of the detection device 10 and the tag control unit 43 of the mobile terminal 40 with a cable, for example. A sensor ID which is specifying information for specifying the detection device 10 is stored in the tag unit 14, specifically in the tag IC 14-1, in advance.

The report unit 15 of the detection device 10 is an LED, a buzzer, and so forth, which starts or stops under the control of the control unit 11. The battery 16 of the detection device 10 supplies power at least to the control unit 11 when the detection device 10 is in a power on state. The power may be supplied to the detection unit 12, the network connection unit 13, the tag unit 14, and the report unit 15 via the control unit 11 or not via the control unit 11, for example.

The network construction device 20 illustrated in FIG. 2A includes a control unit 21, a 3G/LTE communication unit 22, a network construction unit 23, and a storage unit 24. Hereinafter, the "network construction device 20" is also referred to as a "sensor gate module 20."

The control unit 21 of the network construction device 20 controls operations of the 3G/LTE communication unit 22, the network construction unit 23, and the storage unit 24, for example. Since the network construction device 20 includes the 3G/LTE communication unit 22, the network construction device 20 is connectable to the 3G/LTE. Since the network construction device 20 includes the network construction unit 23, the network construction device 20 can construct the WSN. The WSN constructed by the network construction device 20 is provided with, for example, a network ID which is network specifying information for specifying that the WSN is constructed by a specific network construction device 20.

The storage unit 24 of the network construction device 20 stores network construction information (data 001) of the WSN constructed by the network construction device 20 illustrated in FIG. 2B, for example. The network construction information (data 001) includes, for example, a network ID, and a list of sensor IDs of the detection devices 10 connected to the WSN specified by the network ID, and connected states to the WSN of these detection devices 10. If the repeaters 50 are connected to the WSN specified by the network ID, the network construction information (data 001) may further include repeater IDs and connected states to the WSN of the repeaters.

The data storage device 30 illustrated in FIG. 2A includes a control unit 31, a 3G/LTE communication unit 32, and a storage unit 33. Hereinafter, the "data storage device 30" is also referred to as a "cloud server 30."

The storage unit 33 of the data storage device 30 stores plant information (data 002) illustrated in FIG. 2B, for example. The plant information (data 002) includes, for example, a plurality of network IDs, sensor IDs of the detection devices 10 connected to the WSN specified by each network ID, connected states of the detection devices 10, attachment information of the detection devices 10 (SM (sensor module) attachment information), operation conditions of the detection devices 10 (SM operation conditions), and states of the plant equipment and detection values detected by the detection devices 10. The attachment information of the detection device 10 includes an attachment area, such as an address in the plant, and attachment equipment, such as a pipe number to which the detection device 10 is attached, for example. The operation conditions of the detection device 10 include detection items to be detected by the detection unit 12 of the detection device 10, for example. If WSNs to which the repeaters 50 are connected exist, the plant information (data 002) may further include repeater IDs, connected states to these WSNs, and attachment information of the repeaters. The plant information (data 002) include all the items of the network construction information (data 001).

The mobile terminal 40 illustrated in FIG. 2A includes a control unit 41, a 3G/LTE communication unit 42, a tag control unit 43, a position information acquisition unit 44, an input unit 45, and a display unit 46. Hereinafter, the "mobile terminal 40" is also referred to as a "tablet terminal 40."

The tag control unit 43 of the mobile terminal 40 includes a tag reader/writer 43-1, and a tag control antenna 43-2. Storage of information in the tag unit 14 of the detection device 10 and acquisition of information from the tag unit 14 by the tag control unit 43 are automatically performed when the mobile terminal 40 is held over the detection device 10, that is, when the mobile terminal 40 is brought close to a predetermined distance (for example, 10 cm) from the detection device 10, for example. Specific operations of storage of information in the tag unit 14 of the detection device 10 and acquisition of information from the tag unit 14 by the tag control unit 43 are described later with reference to FIG. 2C. The position information acquisition unit 44 is a GPS (global positioning system) receiver capable of acquiring current position information of the mobile terminal 40, for example. The input unit 45 and the display unit 46 of the mobile terminal 40 may be configured by a touch-sensitive display panel modules 45 and 46, for example. Hereinafter, the "touch-sensitive display panel modules 45 and 46" are also referred to as "touch panels 45 and 46."

An application associated with the plant equipment state gathering system 1 is installed in the mobile terminal 40, for example. For example, by executing the application, an operator working in the plant can do work of viewing and editing the plant information stored in the storage device 30 (data 002), a network connection of the detection devices 10, and so forth using the mobile terminal 40. Hereinafter, the "application associated with the plant equipment state gathering system 1" is also referred to as a "plant application." However, the operator may do work of viewing and editing of the plant information stored in the storage device 30 (data 002), a network connection of the detection devices 10, and so forth by using a web browser, for example, and not executing the plant application.

Further, a manager of the plant may view and edit the plant information (data 002) via the 3G/LTE by using a communication terminal, such as an unillustrated laptop computer connectable to the 3G/LTE. Therefore, the manager may monitor the state of the plant equipment distantly without directly monitoring the plant equipment and, if an abnormal state is found, may issue an instruction of repair work and so forth to the operator who carries the mobile terminal 40.

The repeater 50 illustrated in FIG. 2A includes a control unit 51, a network connection unit 52, a tag unit 53, a report unit 54, and a battery 55. The repeater 50 has substantially the same internal structure as that of the detection device 10, but is different from the detection device 10 in that the repeater 50 has no detection unit.

Figure 2C:
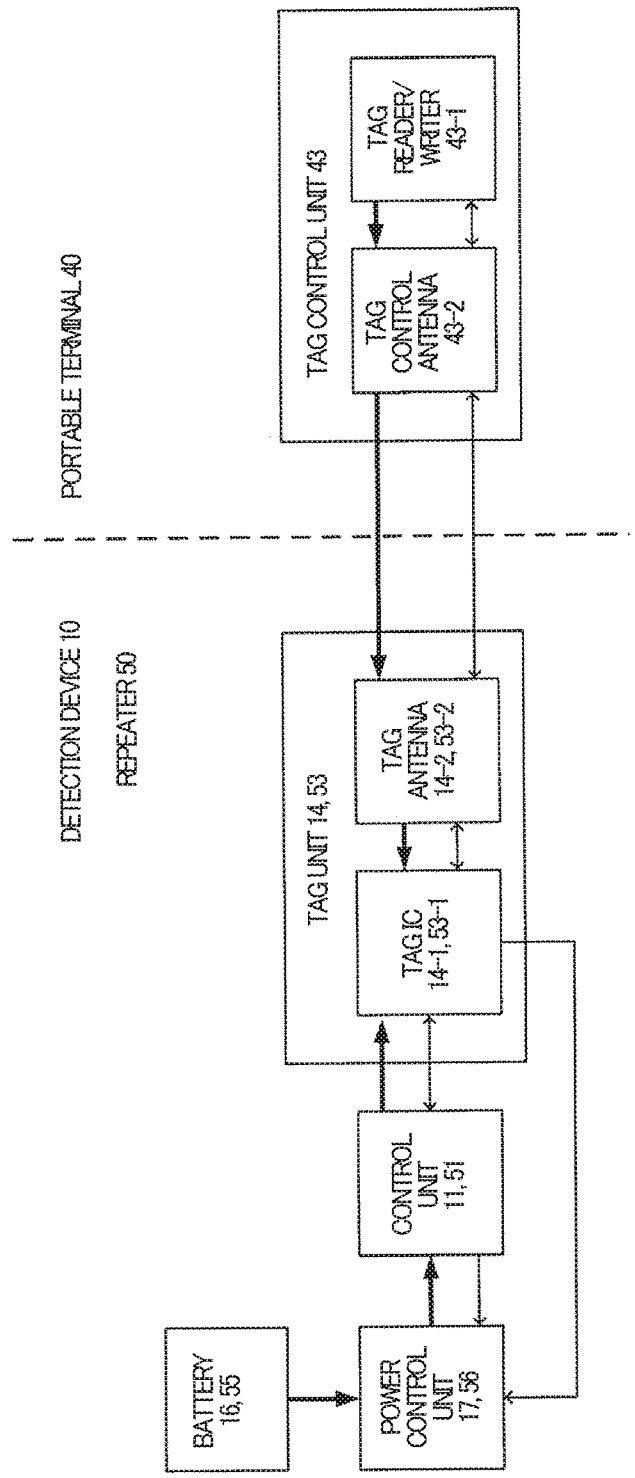
FIG. 2C is a diagram illustrating an example of an operation of storage of information in a tag unit of a detection device and acquisition of information from the tag unit by a tag control unit of a mobile terminal illustrated in FIG. 2A.

Examples of operations of storage of information in the tag unit 14 of the detection device 10 and acquisition of information from the tag unit 14 by the tag control unit 43 of the mobile terminal 40 are described with reference to FIG. 2C. In FIG. 2C, thin arrows in the drawing represent signals, such as instructions, and thick arrows in the drawing represent power supply. Since operations of storage of information in the tag unit 53 of the repeater 50 and acquisition of information from the tag unit 53 by the tag control unit 43 of the mobile terminal 40 are the same, description thereof is omitted.

When the mobile terminal 40 is held over the detection device 10, the tag control unit 43 of the mobile terminal 40 transmits a read signal or a write signal generated by the tag reader/writer 43-1, for example, to the detection device 10, including in an electric wave or a magnetic field generated by the tag control antenna 43-2, for example. In the tag unit 14 of the detection device 10, the electric wave received by the tag antenna 14-2 is rectified or electromagnetic induction by the magnetic field received by the tag antenna 14-2 is performed, whereby power is generated in the tag antenna 14-2. The tag antenna 14-2 supplies generated power to the tag IC 14-1, and the tag IC 14-1 is started. If the signal included in the electric wave or the magnetic field received by the tag antenna 14-2 is a read signal, the started tag IC 14-1 replies information stored in the tag IC 14-1 in accordance with the read signal, including in the electric wave or the magnetic field generated by the tag antenna 14-2. If the signal included in the electric wave or the magnetic field received by the tag antenna 14-2 is a write signal, the started tag IC 14-1 stores the information included in the write signal.

Therefore, when the tag control unit 43 of the mobile terminal 40 stores information in the tag unit 14 and acquires information from the tag unit 14, it is unnecessary to supply power to the tag unit 14 from the inside of the detection device 10. That is, also when the detection device 10 is in a power off state or a sleep state, the tag control unit 43 of the mobile terminal 40 can store the information in the tag unit 14 of the detection device 10 and acquire information from the tag unit 14.

The tag IC 14-1 started by the electric wave or the magnetic field received by the tag antenna 14-2 outputs a start signal to the power control unit 17, for example. The power control unit 17 into which the start signal is input supplies power, which is supplied from the battery 16 to the power control unit 17, at least to the control unit 11, for example. For example, when the control unit 11 to which power is supplied is started, the detection device 10 is set to a power on state. That is, the detection device 10 is configured to be set to a power on state when information is stored in the tag unit 14 by the tag control unit 43 of the mobile terminal 40. When the power of the detection device 10 is in an on state, the control unit 11 supplies power to the tag IC 14-1 of the tag unit 14, whereby storage of information in the tag IC or acquisition of information stored in the tag IC can be performed.

Further, when the detection device 10 which is in a power on state is set to a power off state or a sleep state, the control unit 11 outputs a stop signal or a sleep signal to the power control unit 17. The power control unit 17 into which the stop signal or the sleep signal is input stops or reduces an amount of power supply to at least the control unit 11, for example. For example, when power supply to the control unit 11 is stopped, the detection device 10 is set to a power off state, and when an amount of power supply to the control unit 11 is reduced, the detection device is set to a sleep state.

2. Operation of Plant Equipment State Gathering System

2-1. Gathering of States of Plant Equipment

An example of an operation of the plant equipment state gathering system 1 to gather states of the plant equipment is described with reference to FIGS. 3A and 3B. Here, it is assumed that the sensor module 10 is connected to the WSN constructed by the sensor gate module 20. The connection of the sensor module 10 to the WSN constructed by the sensor gate module 20 is described in "2-2. Attachment of Detection Device (Sensor Gate Module)" later.

In step ST101, the sensor module 10 detects a state of plant equipment to which the sensor module 10 is attached regarding detection items for each predetermined detection interval, and transmits a detected value to the sensor gate module 20 together with the sensor ID of itself (the sensor module 10). That is, the data transmitted in step ST101 is data 101 illustrated in FIG. 3B.

In step ST102, the sensor gate module 20 transmits the received sensor ID and the received detected value to the cloud server 30 via the 3G/LTE together with the network ID of the WSN constructed by itself (the sensor gate module 20). That is, the data transmitted in step ST102 is data 102 illustrated in FIG. 3B.

Here, in step ST102, each time the sensor gate module 20 receives the detected value from one of the sensor modules 10 connected to the WSN constructed by itself (the sensor gate module 20), the sensor gate module 20 may transmit the sensor ID and the detected value together with the network ID. Alternatively, in step ST102, the sensor gate module 20 may temporarily store the received sensor ID and the received detected value, and transmit a plurality of temporarily stored sensor IDs and detected values together with the network IDs for each predetermined transmission interval.

In step ST103, the cloud server 30 makes the received data 102 reflected on the plant information (data 002) stored in the storage unit 33 of the cloud server 30, and updates the plant information (data 002). Step ST101, step ST102, and step ST103 are repeated at any time.

In the plant equipment state gathering system 1, the state of the plant equipment detected by the sensor module 10 is automatically reflected on the plant information (data 002) stored in the cloud server 30. Therefore, it is unnecessary for the operator to move to a position at which target plant equipment is disposed each time the state of the plant equipment is to be detected or checked. Further, the manager can monitor the state of the plant equipment distantly.

2-2. Attachment of Detection Device (Sensor Gate Module)

An example of work of attaching the sensor module 10 to the plant equipment is described with reference to FIGS. 4A, 4B, 4C, 4D, 4E, and 4F. When the operator attaches the sensor module 10 to the plant equipment, the work of attaching the sensor module 10 to the plant equipment proceed to step ST201. When the operator attaches the sensor module 10 to the plant equipment, the sensor module 10 is in a power off state (including an idle state) or a sleep state.

In step ST201, the operator inputs setting information about the sensor module 10 attached to the plant equipment in the tablet terminal 40. The data input in step ST201 is data 201 illustrated in FIG. 4B. That is, the data 201 input in step ST201 includes network information for connecting the sensor module 10 to the WSN constructed by the sensor gate module 20, and attachment information of the sensor module 10 (SM attachment information) and an operation condition of the sensor module 10 (an SM operation condition).

The network information of the data 201 includes a network ID and a network password for connecting to the WSN specified by the network ID. The operation condition of the sensor module 10 (the SM operation condition) of the data 201 includes the detection interval which is the interval at which the state of the plant equipment to which the sensor module 10 is attached is detected, and the detection items. The detection items of the operation condition of the sensor module 10 (the SM operation condition) are independently determined for each type and performance of the plant equipment, for example. For example, if the plant equipment to which the sensor module 10 is attached is a steam trap, temperature is set as the detection item and, if the plant equipment to which the sensor module 10 is attached is a rotating machine, temperature and vibration are set as the detection items.

Figure 4A:
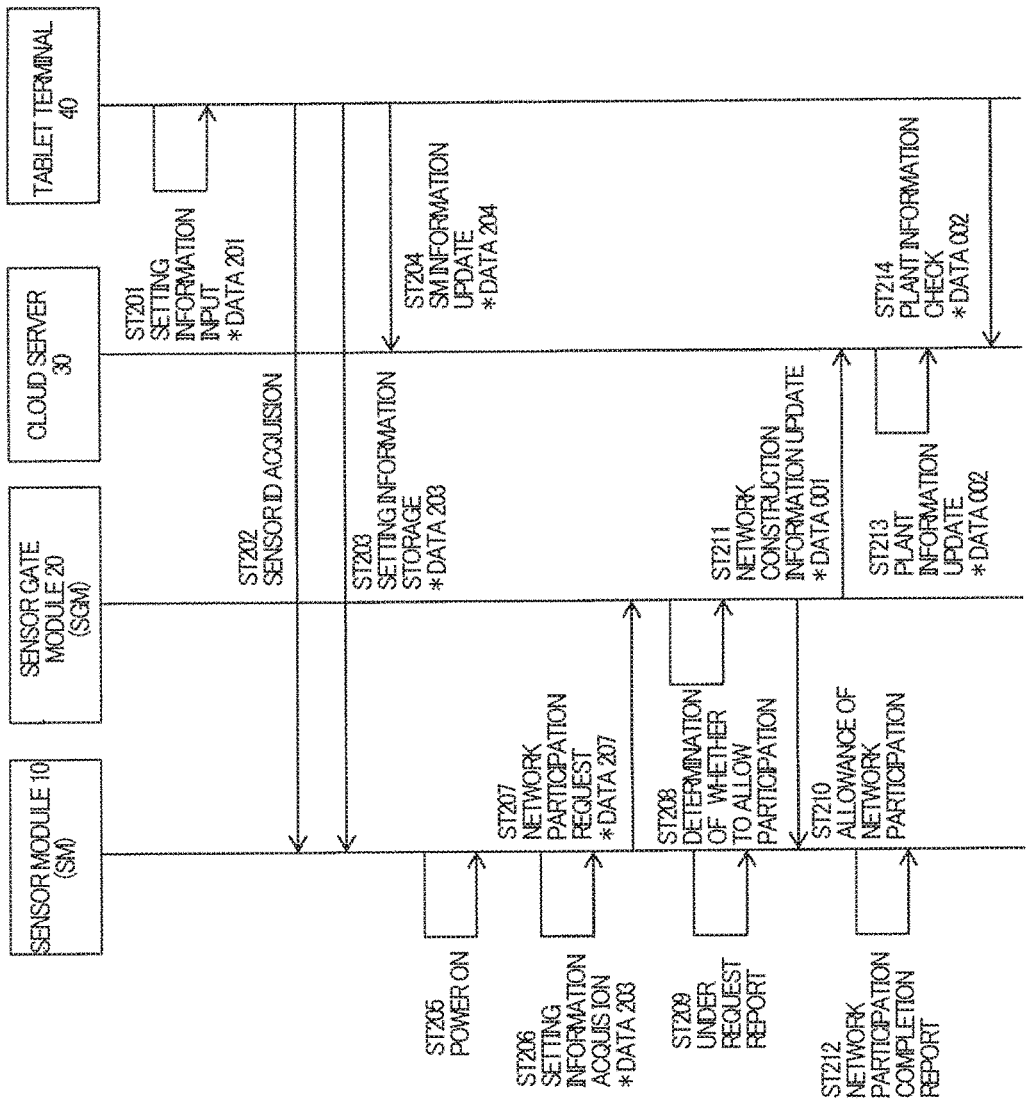
FIG. 4A is a flowchart illustrating an example of work of attaching a detection device illustrated in FIG. 1.
Figure 4C:
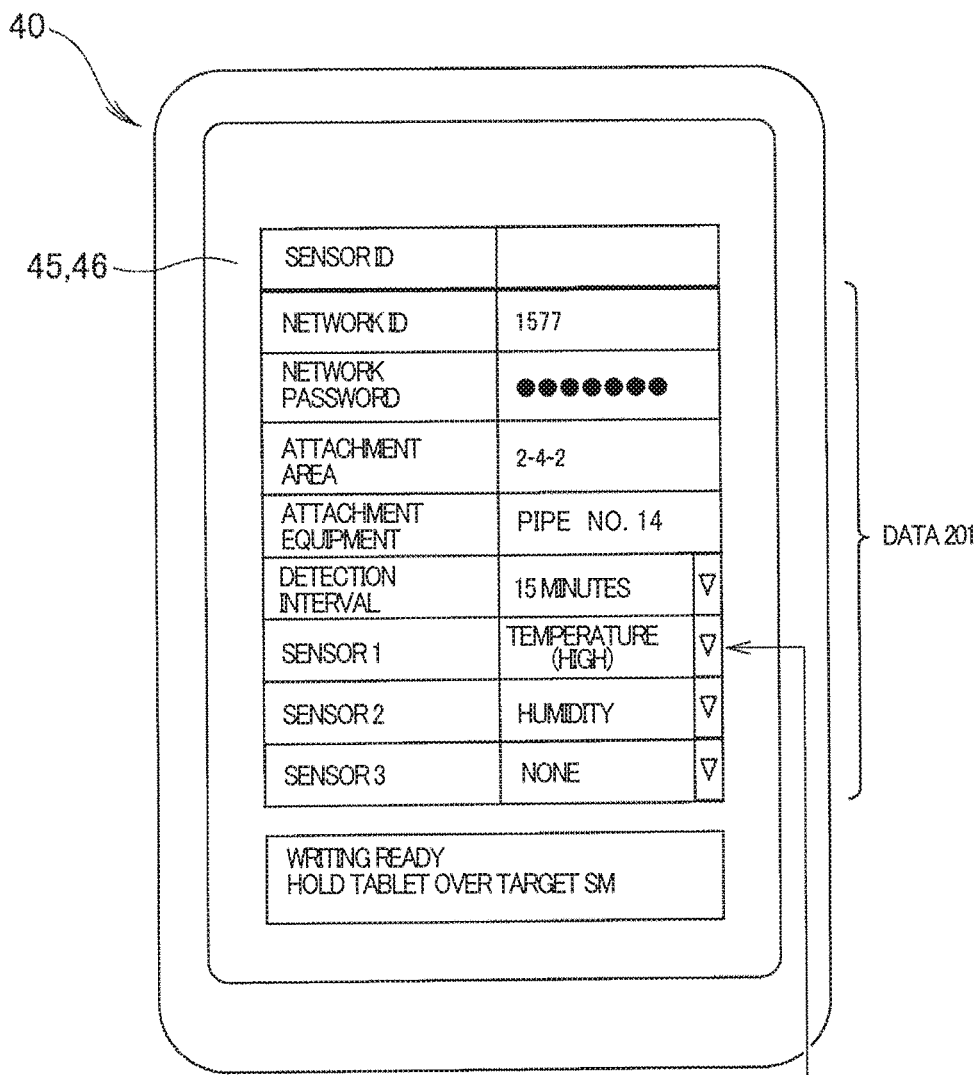
FIG. 4C is a diagram illustrating an display example of a display unit of the mobile terminal illustrated in FIG. 1 in the work illustrated in FIG. 4A.

FIG. 4C illustrates an example of the touch panels 45 and 46 of the tablet terminal 40 while the operator is inputting using the plant application in step ST201. In the example illustrated in FIG. 4C, the detection items are illustrated as a sensor 1, a sensor 2, and a sensor 3. In the example illustrated in FIG. 4C, downward-facing triangle marks which are examples of display showing that input is possible by selecting from a list are illustrated in the detection interval, the sensor 1, the sensor 2, and the sensor 3 among the setting items. As illustrated in the lower part of FIG. 4C, when a setting item with which a downward-facing triangle mark is displayed (for example, the sensor 1) is selected, a selection list is displayed. In the example illustrated in FIG.

4C, setting items with which no downward-facing triangle mark is displayed can be input in text.

Input of the setting information may be performed by selecting from a list also about setting items, such as attachment equipment, for example. Further, input of the setting information may be performed by acquiring current position information of the tablet terminal 40 by the position information acquisition unit 44 of the tablet terminal 40, and inputting the acquired position information as the attachment area. If the acquired position information is coordinate information, address information in the plant converted by a plant application, for example, may be input as the attachment area. By inputting the current position information of the tablet terminal 40 as an attachment area of the sensor module 10, it is unnecessary for the operator to check and input the attachment area of the sensor module 10. Therefore, the work of attaching the sensor module 10 to the plant equipment can be simplified.

As illustrated in FIG. 4C, when the input of data 201, that is, the network information, the attachment information of the sensor module 10 (the SM attachment information), and the operation condition of the sensor module 10 (the SM operation condition) is completed, "writing ready" is displayed, for example.

In step ST202, the operator holds the tablet terminal 40 over the sensor module 10, whereby the sensor ID stored in the tag unit 14 of the sensor module 10 is automatically acquired by the tag control unit 43 of the tablet terminal 40. That is, the operator brings the tablet terminal 40 close to the sensor module 10 to a distance at which the sensor ID stored in the tag unit 14 of the sensor module 10 can be acquired by the tag control unit 43 of the tablet terminal 40.

In step ST203, when the operator holds the tablet terminal 40 over the sensor module 10 in step ST202, a part of the setting information input into the tablet terminal 40 is automatically stored in the tag unit 14 of the sensor module 10. That is, while the operator holds the tablet terminal 40 over the sensor module 10, the tablet terminal 40 automatically acquires the sensor ID and, immediately thereafter, the tablet terminal 40 makes the tag unit 14 of the sensor module 10 automatically store a part of the input setting information. A part of the setting information stored in the tag unit 14 of the sensor module 10 in step ST203 is data 203. The data 203 input in step ST203 includes the network information and the operation condition of the sensor module 10 (the SM operation condition).

Figure 4D:
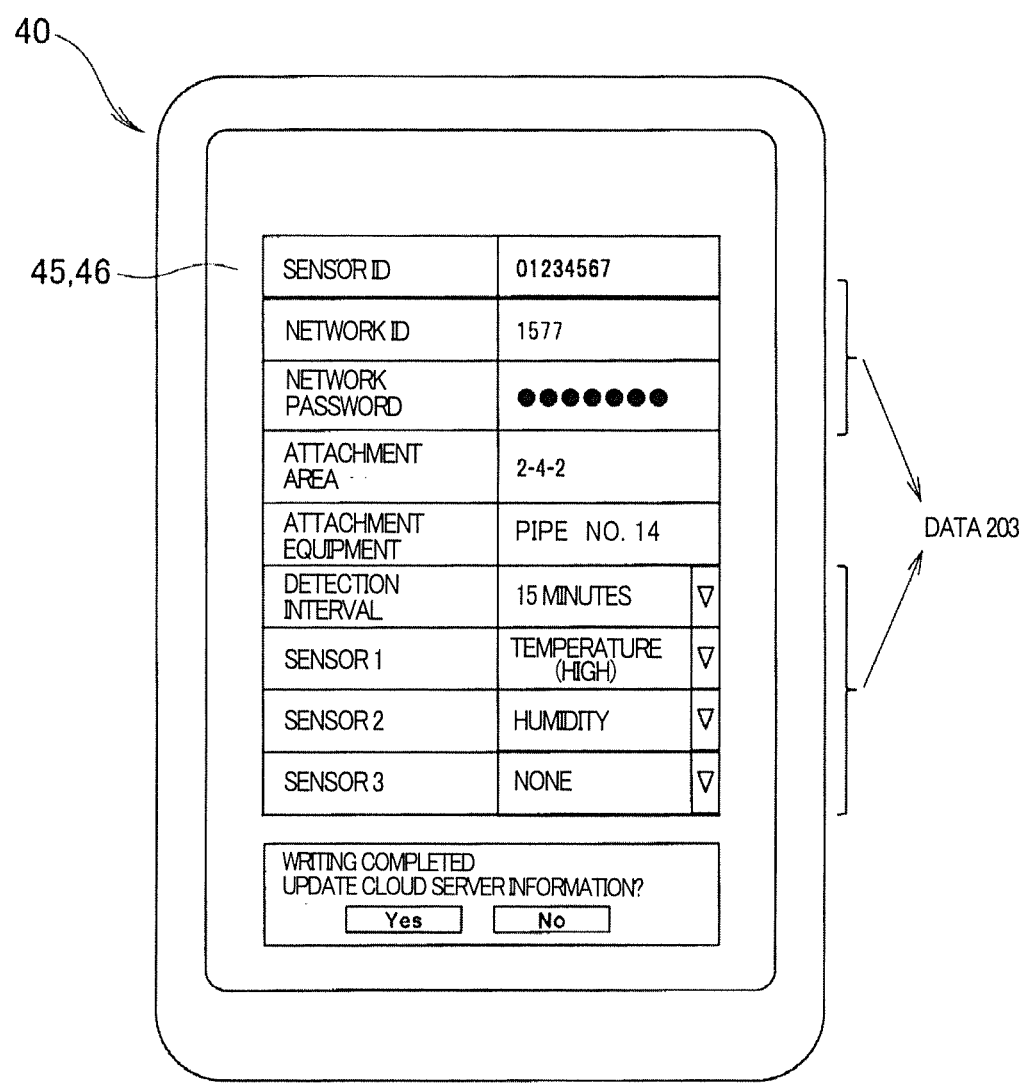
FIG. 4D is a diagram illustrating a display example of the display unit of the mobile terminal illustrated in FIG. 1 in the work illustrated in FIG. 4A.

FIG. 4D illustrates an example of the touch panels 45 and 46 of the tablet terminal 40 when the data 203 is stored in the tag unit 14 of the sensor module 10 using the plant application. As illustrated in FIG. 4D, when storage of the data 203 in the tag unit 14 of the sensor module 10 is completed, "writing completed" is displayed, for example. As illustrated in FIG. 4D, if "No" is touched while "Update cloud server information?" is displayed, the process returns to the step after the input of step ST201, for example. At this time, the example of FIG. 4C is displayed on the touch panels 45 and 46, for example.

As illustrated in FIG. 4D, if "Yes" is touched while "Update cloud server information?" is displayed, the process proceeds to step ST204. In step ST204, the tablet terminal 40 transmits sensor module information (SM information) including a sensor ID, attachment information of the sensor module 10 (SM attachment information), and an operation condition of the sensor module 10 (SM operation condition) to the cloud server 30. The data transmitted in step ST204 is data 204 illustrated in FIG. 4B. When the data 204 is received, the cloud server 30 makes the data 204 reflected on the plant information (data 002) stored in the storage unit 33 of the cloud server 30.

In step ST205, the sensor module 10 is set to a power on state when the data 203 is stored in step ST203. If the sensor module 10 is set to a power on state, the process proceeds to step ST206. In step ST206, the control unit 11 of the sensor module 10 acquires the data 203 stored in the tag unit 14.

In step ST207, the sensor module 10 transmits a network participation request to the sensor gate module 20. Data transmitted in the network participation request in step ST207 is data 207 including the sensor ID and the network information illustrated in FIG. 4B.

In step ST208, the sensor gate module 20 which received the network participation request determines whether the sensor module 10 which has transmitted the network participation request can participate in the network. That is, the sensor gate module 20 determines whether the network ID and the network password of the network information included in the network participation request match the network ID and the network password of the WSN constructed by itself (the sensor gate module 20). When the network ID and the network password of the network information included in the network participation request match the network ID and the network password of the WSN constructed by itself (the sensor gate module 20), the process proceeds to step ST210. On the other hand, if the network ID and the network password of the network information included in the network participation request do not match the network ID and the network password of the WSN constructed by itself (the sensor gate module 20), the process proceeds to step ST214 without executing steps ST210, ST211, ST212, and ST213.

In step ST209, since the network participation request is transmitted in step ST207, the sensor module 10 reports that the network participation request is being issued. For example, if the report unit 15 of the sensor module 10 includes an LED, the control unit 11 of the sensor module 10 reports that the network participation request is being issued by making the LED blink, for example. The operator can recognize that the network participation request is transmitted from the sensor module 10 by viewing that the LED is blinking, for example.

In step ST210, the sensor gate module 20 allows participation of the sensor module 10 in the network, and connects the sensor module 10 to the WSN constructed by itself (the sensor gate module 20). In step ST211, the sensor gate module 20 adds the sensor ID and the connected state of the sensor module 10 which has been allowed to participate in the network in step ST210 to the network construction information (data 001), and transmits to the cloud server 30.

In step ST212, the sensor module 10 reports that participation in the network is completed. For example, the control unit 11 of the sensor module 10 reports that participation in the network is completed by turning off the LED which is blinking in step ST209. The operator can recognize that the connection of the sensor module 10 to the WSN is completed by viewing that the LED is turned off, for example.

In step ST213, the cloud server 30 makes the data 001 received in step ST211 reflected on the plant information (data 002) stored in the storage unit 33 of the cloud server 30. In step ST214, the operator checks the plant information (data 002) stored in the storage unit 33 of the cloud server 30 using the tablet terminal 40.

Here, although step ST214 is illustrated as the last step in the example illustrated in FIG. 4A, the operator can check the plant information (data 002) at any time after step ST204.

Figure 4E:
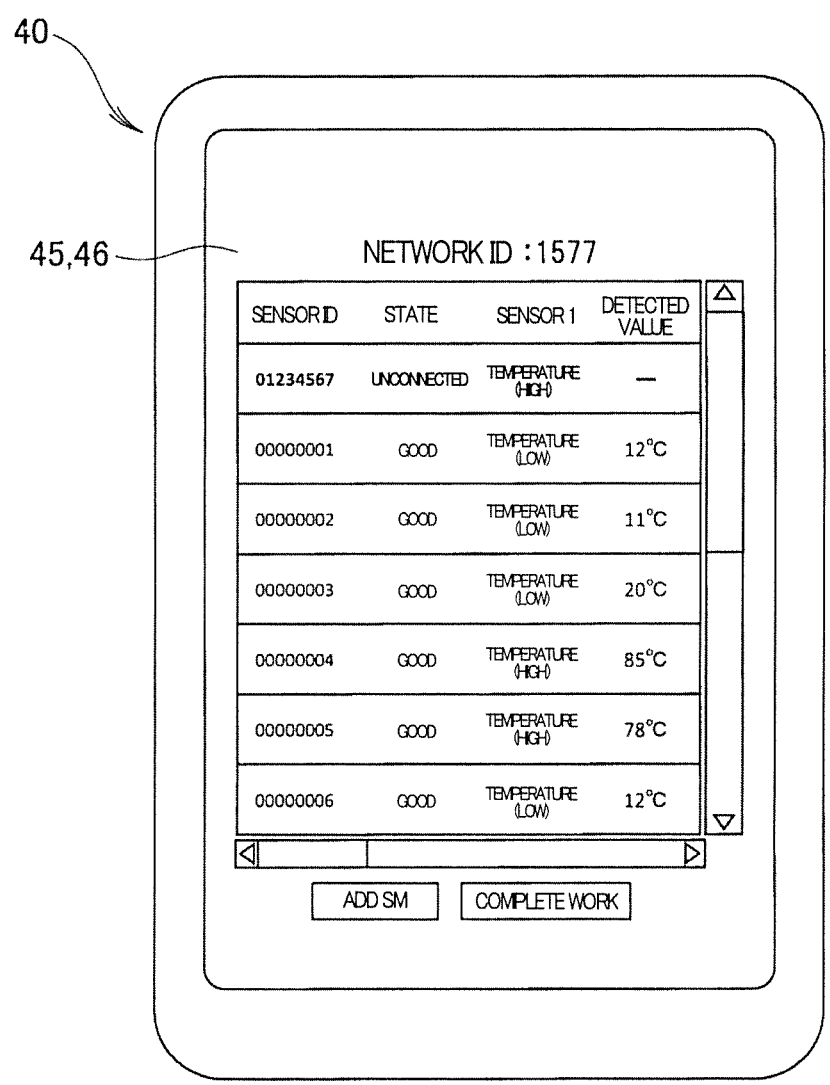
FIG. 4E is a diagram illustrating a display example of the display unit of the mobile terminal illustrated in FIG. 1 in the work illustrated in FIG. 4A.

If the operator checks the plant information (data 002) before step ST213 is completed, for example, an example of a check screen of the plant information (data 002) using the plant application as illustrated in FIG. 4E is displayed on the touch panels 45 and 46 of the tablet terminal 40. In the example illustrated in FIG. 4E, information about the WSN specified by a network ID:1577 among the pieces of plant information (data 002) is displayed. The example illustrated in FIG. 4E shows that the sensor module 10 newly transmitted the network participation request in step ST207 is not connected to the WSN.

Figure 4F:
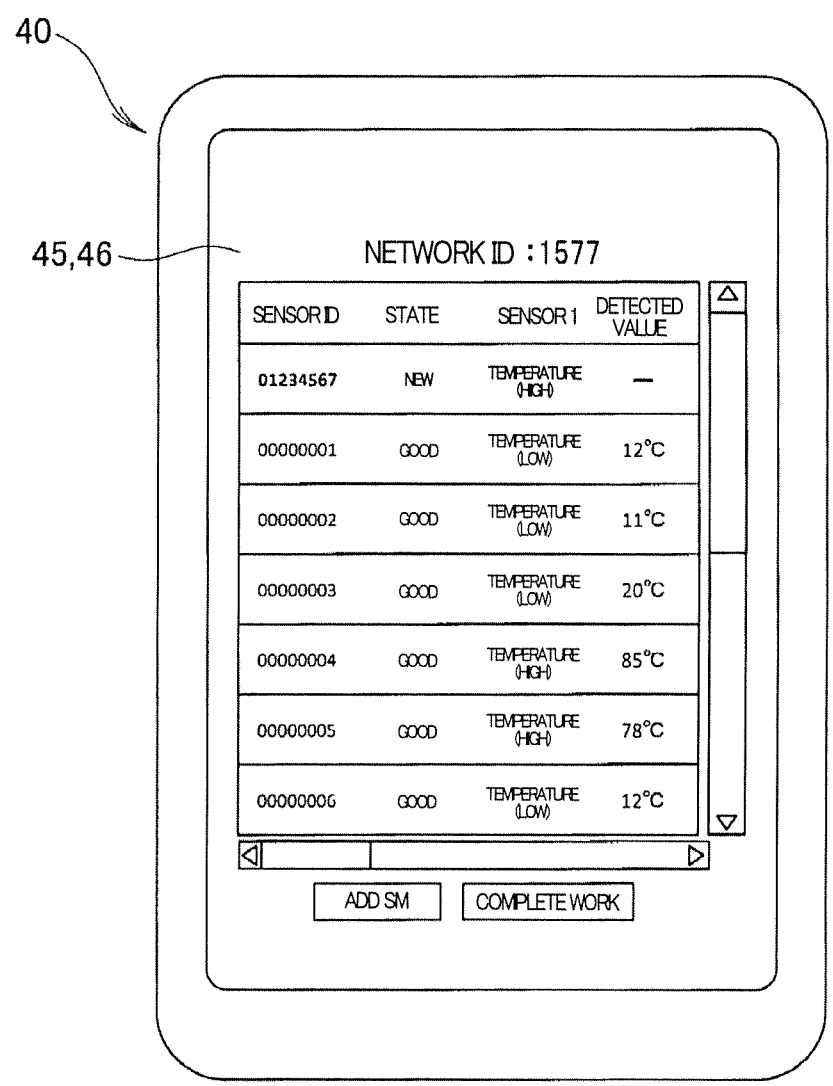
FIG. 4F is a diagram illustrating a display example of the display unit of the mobile terminal illustrated in FIG. 1 in the work illustrated in FIG. 4A.

If the operator checks the plant information (data 002) after step ST213 is completed, for example, an example of a check screen of the plant information (data 002) using the plant application as illustrated in FIG. 4F is displayed on the touch panels 45 and 46 of the tablet terminal 40. Also in the example illustrated in FIG. 4F, information about the WSN specified by a network ID:1577 among the pieces of plant information (data 002) is displayed. The example illustrated in FIG. 4F shows that the sensor module 10 newly transmitted the network participation request in step ST207 is newly connected to the WSN.

In the example illustrated in FIG. 4E or in the example illustrated in FIG. 4F, when "Add SM" is selected, a screen for inputting setting information of other sensor module 10, for example, a screen illustrated in FIG. 4C, is displayed on the touch panels 45 and 46 of the tablet terminal 40. That is, work of attaching other sensor module 10 to the plant equipment can be done. In the example illustrated in FIG. 4E or in the example illustrated in FIG. 4F, when "Complete work" is selected, the work of attaching the sensor module 10 to the plant equipment can be completed.

The plant equipment state gathering system 1 can automatically set the network information input into the tablet terminal 40 to the sensor module 10 by holding the tablet terminal 40 over the sensor module 10. That is, an operation to store the network information in the sensor module 10 with respect to the tablet terminal 40 wiredly connected to the sensor module 10 is unnecessary, for example. Therefore, since the work of connecting a cable and so forth connecting the tablet terminal 40 and the sensor module 10 and the work of replacing the cable are not required, the work of attaching the sensor module 10 to the plant equipment can be simplified.

It is unnecessary for the plant equipment state gathering system 1 to be provided with an external interface, such as a switch or a connector terminal, for wiredly connecting the tablet terminal 40 to the sensor module 10, for example. Therefore, as compared with a case where the sensor module 10 is provided with an external interface, such as a switch or a connector terminal, a structure for dustproofing and/or waterproofing can be easily implemented. The plant equipment state gathering system 1 communicate between the sensor module 10 and the tablet terminal 40 using an electric wave or a magnetic field. Therefore, even if a surface of the sensor module 10 becomes dirty, for example, communication between the sensor module 10 and the tablet terminal 40 can be established without removing dirt of the surface of the sensor module 10. Therefore, in the plant equipment state gathering system 1, the position at which the sensor module 10 is attached is not limited even in an environment in which the surface of the sensor module 10 may become dirty, such as a place with no roof, for example.

The plant equipment state gathering system 1 can automatically acquire the sensor ID stored in the tag unit 14 of the sensor module 10 when the tablet terminal 40 is held over the sensor module 10. Therefore, since it is unnecessary for the operator to manually input the sensor ID, for example, occurrence of erroneous input of the sensor ID can be prevented. Immediately after acquiring the sensor ID of the sensor module 10 by the tablet terminal 40, the network information input in the tablet terminal 40 can be stored in the tag unit 14 of the sensor module 10. Therefore, since acquisition of the sensor ID by the tablet terminal 40 and storage of the network information in the sensor module 10 by the tablet terminal 40 can be implemented by one operation to hold the tablet terminal 40 over the sensor module 10, the work of attaching the sensor module 10 to the plant equipment can be simplified.

Further, it is unnecessary for the tablet terminal 40 to store a plurality of sensor IDs corresponding to a plurality of sensor modules 10, for example, and it is unnecessary for the operator to operate the tablet terminal 40 wirelessly connected to the sensor module 10 to specify a desired sensor module 10. The operator can reliably acquire the sensor ID of the desired sensor module 10 only by holding the tablet terminal 40 over a desired sensor module 10.

Further, when the network information is stored in the tag unit 14 of the sensor module 10 by the tablet terminal 40, the plant equipment state gathering system 1 transmits the sensor ID, the attachment information of the sensor module 10 (the SM attachment information), and the operation condition of the sensor module 10 (the SM operation condition) to the cloud server 30. The operator can check whether the sensor module 10 attached to the plant equipment has been connected to the network on the tablet terminal 40 by making these pieces of information received by the cloud server 30 reflected on the plant information (data 002).

Here, timing at which the sensor module 10 is set to a power on state, that is, timing at which power is supplied to the control unit 11 of the sensor module 10, is mainly described in detail with reference to a timing diagram illustrated in FIG. 4G.

Figure 4G:
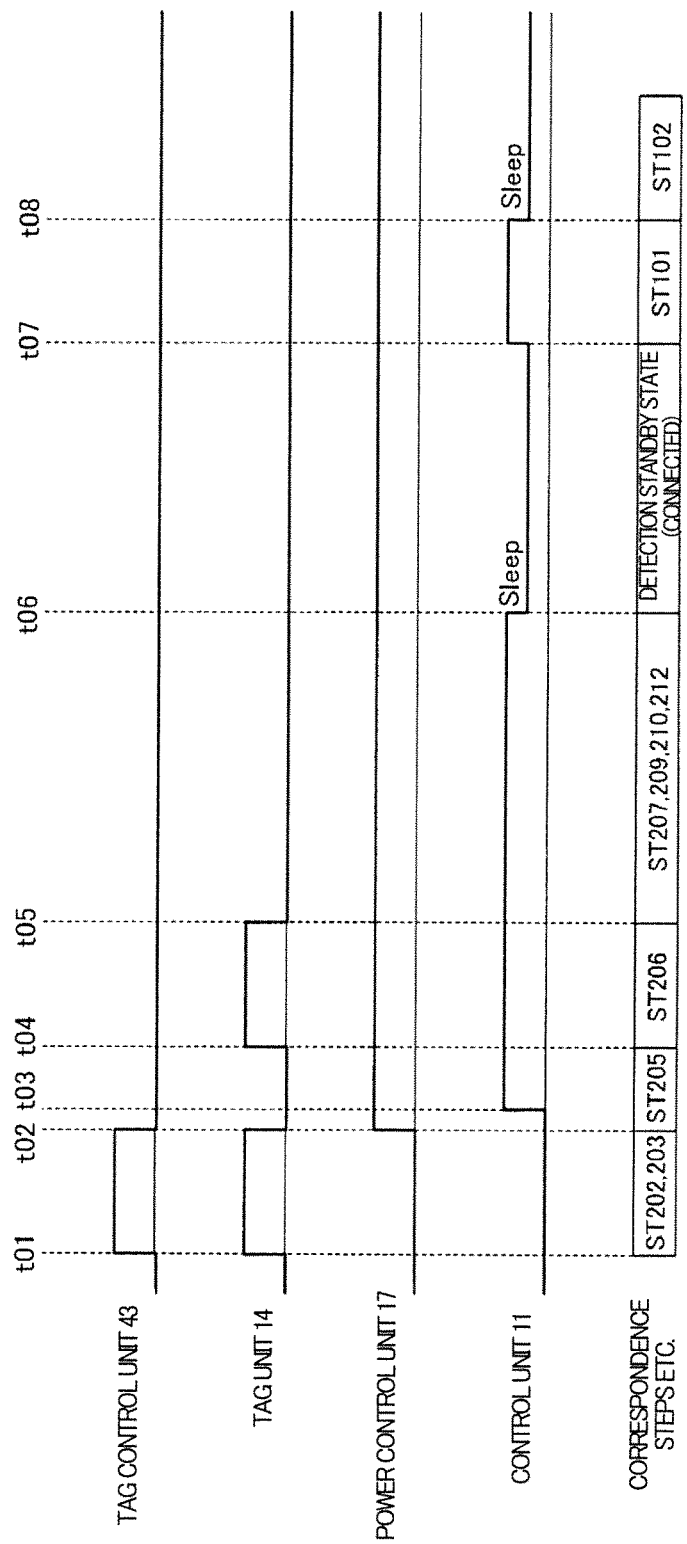
FIG. 4G is a timing diagram illustrating a state of each configuration of the plant equipment state gathering system of the present invention in the work illustrated in FIG. 4A and in the operation illustrated FIG. 3A.

Time t01 illustrated in FIG. 4G is time at which the tablet terminal 40 is held over the sensor module 10 by the operator in step ST202 of FIG. 4A, for example. At time t01, a read signal is transmitted included in the electric wave or the magnetic field by the tag control unit 43 of the tablet terminal 40, for example. The tag unit 14, specifically, the tag IC 14-1, of the sensor module 10 which received the electric wave or the magnetic field in which the read signal is included is started. At this time, the control unit 11 of the sensor module 10 is not started, and the sensor module 10 is in a power off state or a sleep state.

At time t02 illustrated in FIG. 4G at which step ST203 is also executed following step ST202, for example, and storage of the data 203 in the tag unit 14 illustrated in FIG. 4B is completed, the tag unit 14 outputs a start signal, for example, to the power control unit 17. The power control unit 17 into which the start signal is input starts power supply at least to the control unit 11. After the tag unit 14 outputs the start signal, if the tablet terminal 40 is separated from the sensor module 10, for example, the tag unit 14 can no longer receive the electric wave or the magnetic field from the tag control unit 43 of the tablet terminal 40, and power is no longer supplied to the tag unit 14.

At time t03 illustrated in FIG. 4G, that is, immediately after the power control unit 17 starts power supply to the control unit 11, for example, the control unit 11 is started and the sensor module 10 is set to a power on state. At time t04 illustrated in FIG. 4G at which step ST206 is executed, for example, the control unit 11 supplies power to the tag unit 14 and acquires the data 203 stored in the tag unit 14. At time t05 illustrated in FIG. 4G at which acquisition of the data 203 of step ST206 is completed, the control unit 11 may stop power supply to the tag unit 14, for example.

Then, at time t06 illustrated in FIG. 4G at which a network participation completion report of step ST212 is issued, for example, the control unit 11 may make the power control unit 17 reduce a power supply amount to the control unit 11. The control unit 11 to which the power supply amount is reduced is set to a sleep state, in which state the control unit 11 stands by a start of detection of a plant equipment state. The detection of the plant equipment state may be started when time determined as a detection interval included in the data 203 elapses from time t06 illustrated in FIG. 4G, for example, when a signal for starting detection is received from the cloud server 30 via the sensor gate module 20, or at time t06 illustrated in FIG. 4G.

Figure 3A:
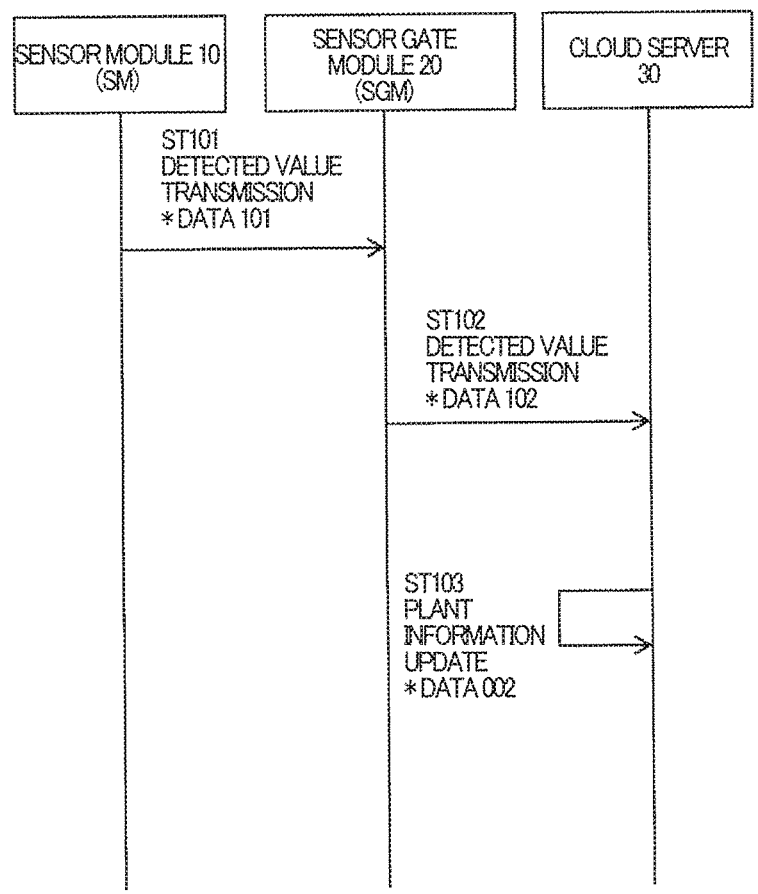
FIG. 3A is a flowchart illustrating an example of an operation to gather states of plant equipment by the plant equipment state gathering system illustrated in FIG. 1.

At time t07 illustrated in FIG. 4G at which detection of the plant equipment state is started, for example, the control unit 11 makes the power control unit 17 increase the power supply amount to the control unit 11, and the control unit 11 executes step ST101 of FIG. 3A. A time t08 illustrated in FIG. 4G at which execution of step ST101 is completed, for example, the control unit 11 may make the power control unit 17 reduce the power supply amount to the control unit 11. Then, for each detection interval included in the data 203, the control unit 11 makes the power control unit 17 increase the power supply amount to the control unit 11 and executes step ST101 of FIG. 3A.

As described above, in the plant equipment state gathering system 1, when the network information input into the tablet terminal 40 is stored in the tag unit 14 of the sensor module 10, the sensor module 10 is set to a power on state. Therefore, even in a case where standby time until the sensor module 10 is connected to the network is long after the sensor module 10 is attached to the plant equipment, since it is unnecessary to stand by in a power on state, consumption of battery can be lowered. Further, since it is unnecessary that the operator operates a power switch of the sensor module 10, and so forth, to set the sensor module 10 to a power on state, the work of attaching the sensor module 10 to the plant equipment can be simplified.

2-3. Attachment Cancellation of Detection Device (Sensor Gate Module)

An example of work of cancelling attachment of the sensor module 10 to the plant equipment is described with reference to FIGS. 5A, 5B, and 5C. The work of cancelling attachment of the sensor module 10 to the plant equipment is performed when the sensor module 10 attached to the plant equipment is not connected to the WSN even after enough time elapses after step ST204 of "2-2. Attachment of Detection Device (Sensor Gate Module)," for example.

In step ST301, the operator selects a sensor module 10 of which connection to the network is to be cancelled using the tablet terminal 40. For example, the operator selects a sensor module 10 which is a non-connected state in the example illustrated in FIG. 4E. When the operator selects a sensor module 10 of which connection to the network is to be cancelled, a screen as illustrated in FIG. 5C is displayed on the touch panels 45 and 46 of the tablet terminal 40, for example.

In step ST302, the operator holds the tablet terminal 40 over the sensor module 10, and acquires the sensor ID of the sensor module 10. For example, the operator automatically acquires the sensor ID by holding the tablet terminal 40 over the sensor module 10 while a screen as illustrated in FIG. 5C is displayed on the touch panels 45 and 46 of the tablet terminal 40.

In step ST303, the control unit 41 of the tablet terminal 40 determines whether the sensor ID of the sensor module 10 selected in step ST301 and the sensor ID acquired in step ST302 match each other. If the sensor ID of the sensor module 10 selected in step ST301 and the sensor ID acquired in step ST302 match each other, the process proceeds to step ST304. On the other hand, if the sensor ID of the sensor module 10 selected in step ST301 and the sensor ID acquired in step ST302 do not match each other, the process returns to the state where the sensor module 10 to be cancelled is selected in step ST301, for example. At this time, a display that the sensor module 10 to be cancelled is different, and a display for encouraging the operator to hold again the tablet terminal 40 over the sensor module 10 to be cancelled, for example, are displayed on the touch panels 45 and 46 of the tablet terminal 40.

In step ST304, the tablet terminal 40 automatically initializes setting information stored in the tag unit 14 of the sensor module 10 using the tag control unit 43. When the setting information stored in the tag unit 14 of the sensor module 10 is initialized, only the sensor ID of the sensor module 10 is stored in the tag unit 14 of the sensor module 10. That is, if it is determined that the sensor IDs match each other in step ST303, the setting information of the sensor module 10 is initialized while the operator holds the tablet terminal 40 over the sensor module 10 in step ST302.

In step ST305, the tablet terminal 40 transmits the sensor module information (the SM information) to the cloud server 30. The sensor module information (the SM information) transmitted in step ST305 includes data 305 illustrated in FIG. 5B, that is, the sensor ID of the sensor module 10 of which setting information is initialized in step ST304.

In step ST306, the sensor module 10 of which setting information is initialized in step ST304 is set to a power off state. Alternatively, in step ST306, the sensor module 10 of which setting information is initialized in step ST304 may be set to a sleep state.

In step ST307, the cloud server 30 updates the plant information (data 002) to reflect the sensor module information (the SM information) received in step ST305. For example, the cloud server 30 deletes the information about the sensor module 10 of which setting information is initialized in step ST304 from the plant information (data 002).

In the plant equipment state gathering system 1, the operator can cancel the attachment of the sensor module 10 to the plant equipment by selecting the sensor module 10 to be cancelled on the tablet terminal 40, and holding the tablet terminal 40 over the sensor module 10 to be cancelled. That is, it is unnecessary for the operator to independently perform the three works of initializing the setting information of the sensor module 10 to be cancelled, reflecting the cancellation of attachment of the sensor module 10 on the plant information (data 002) of the cloud server 30, and setting the sensor module 10 to be cancelled to a power off state. Therefore, in the plant equipment state gathering system 1, the work of cancelling attachment of the sensor module 10 to the plant equipment can be simplified.

The work of canceling attachment of the sensor module 10 to the plant equipment described here may be performed during replacement of the sensor module 10. The work of canceling attachment of the sensor module 10 to the plant equipment described here may be applied also when the sensor module 10 which requires replacement is replaced because, for example, residual capacity of the battery 16 of the sensor module 10 decreases. Inside of the plant is usually an explosion-proof area. Therefore, when the residual capacity of the battery 16 of the sensor module 10 decreases, it is necessary to replace the entire sensor module 10 instead of replacing the battery 16 from the sensor module 10. Therefore, in the plant equipment state gathering system 1, replacement work of the sensor module 10 can be simplified.

Here, timing at which the sensor module 10 is set to a power off state or a sleep state, that is, timing at which power supply to the control unit 11 of the sensor module 10 to be cancelled is stopped or the power supply amount is reduced is mainly described in detail with reference to a timing diagram illustrated in FIG. 5D. In the timing diagram illustrated in FIG. 5D, steps until time t15 are the same as those until time t05 illustrated in FIG. 4G. That is, time t11 illustrated in FIG. 5D corresponds to t01 illustrated in FIG. 4G, time t12 illustrated in FIG. 5D corresponds to t02 illustrated in FIG. 4G, time t13 illustrated in FIG. 5D corresponds to t03 illustrated in FIG. 4G, time t14 illustrated in FIG. 5D corresponds to t04 illustrated in FIG. 4G, and time t15 illustrated in FIG. 5D corresponds to t05 illustrated in FIG. 4G. Here, after time t15 illustrated in FIG. 5D is described.

After step ST207 illustrated in FIG. 4A is executed, the control unit 11 of the sensor module 10 executes an under request report of step ST209, and is set to a connection standby state. For example, if the connection standby state is long, the operator selects a sensor module 10 of which connection to the network is to be cancelled in step ST301 illustrated in FIG. 5A.

Figure 5A:
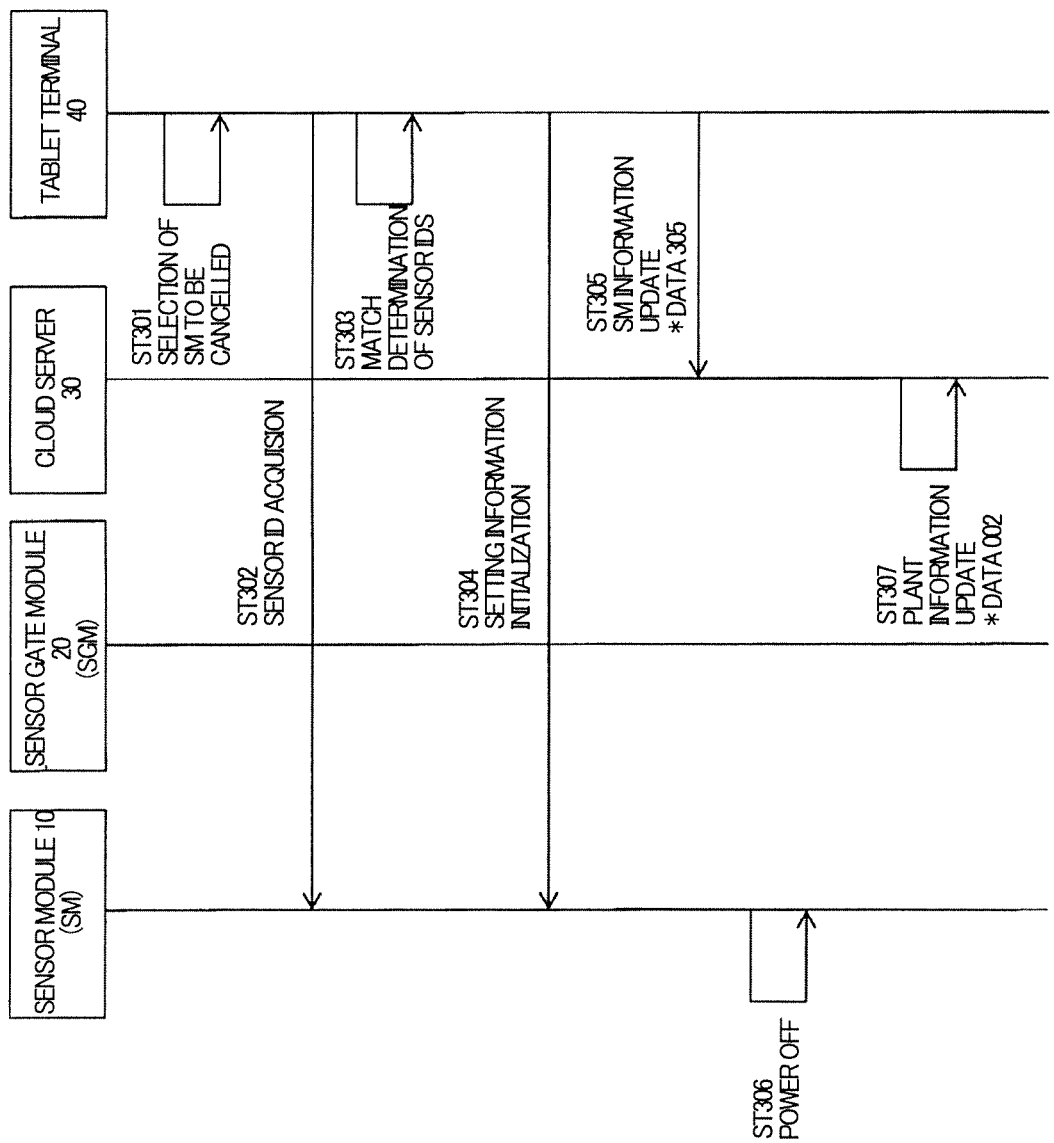
FIG. 5A is a flowchart illustrating an example of work when canceling attaching of the detection device illustrated in FIG. 1.
Figure 5B:
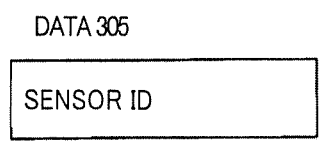
FIG. 5B is a diagram illustrating an example of a data structure used in the work illustrated in FIG. 5A.
Figure 5C:
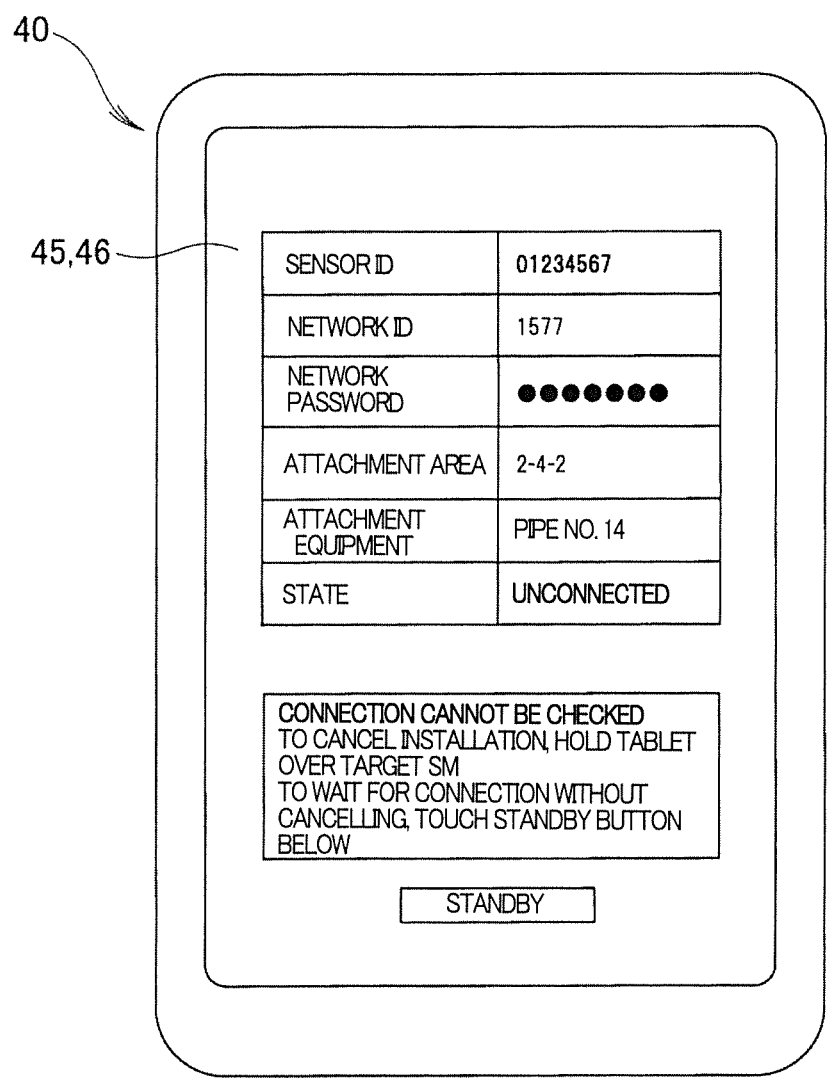
FIG. 5C is a diagram illustrating a display example of the display unit of the mobile terminal illustrated in FIG. 1 in the work illustrated in FIG. 5A.
Figure 5D:
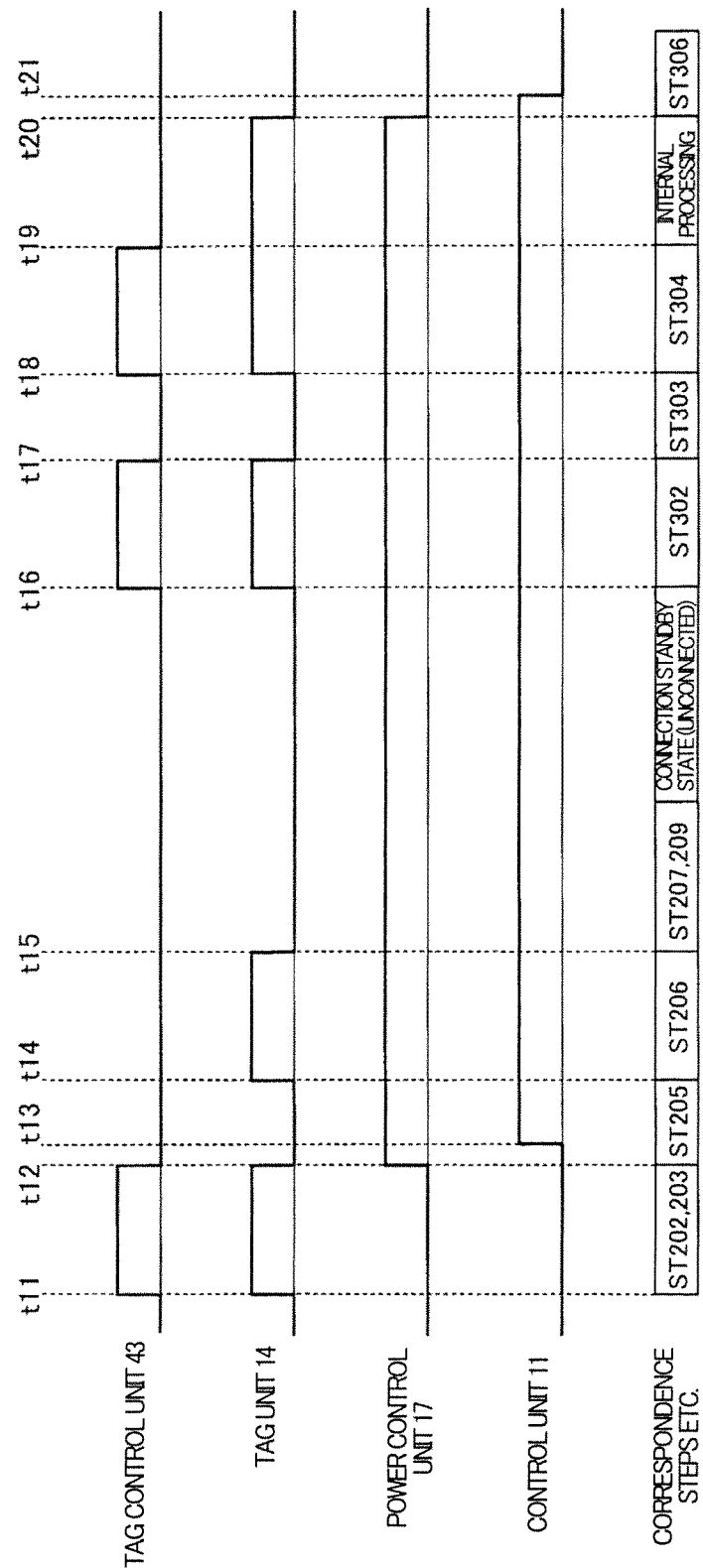
FIG. 5D is a timing diagram illustrating a state of each configuration of the plant equipment state gathering system of the present invention in the work illustrated in FIG. 4A and FIG. 5A.

Time t16 illustrated in FIG. 5D is time at which the operator holds the tablet terminal 40 over the sensor module 10 to be cancelled in step ST302 of FIG. 5A, for example. When the tablet terminal 40 is held over the sensor module 10, the tag unit 14 of the sensor module 10 is started upon receiving the electric wave or the magnetic field which includes a read signal, for example, from the tag control unit 43 of the tablet terminal 40. At time t17 illustrated in FIG. 5D when the tag control unit 43 acquires the sensor ID, for example, the control unit 41 of the tablet terminal 40 makes determination of step ST303.

FIG. 5D shows that transmission of the electric wave or the magnetic field from the tag control unit 43 to the tag unit 14 is stopped while the control unit 41 of the tablet terminal 40 makes determination of step ST303. However, transmission of the electric wave or the magnetic field from the tag control unit 43 to the tag unit 14 may be continued while the control unit 41 of the tablet terminal 40 makes determination of step ST303.

At time t18 illustrated in FIG. 5D at which it is determined that the sensor IDs match each other in step ST303, for example, the tag control unit 43 transmits an initializing signal, for example, to the tag unit 14 of the sensor module 10 included in an electric wave or a magnetic field. At time t19 illustrated in FIG. 5D at which the tag unit 14 receives the initializing signal, for example, the control unit 11 of the sensor module 10 initializes the setting information stored in the tag unit 14, and sets the state in which only the sensor ID is stored in the tag unit 14.

At time t20 illustrated in FIG. 5D at which initialization of the setting information stored in the tag unit 14 is completed, for example, the control unit 11 outputs a stop signal or a sleep signal to the power control unit 17. The power control unit 17 into which the stop signal or the sleep signal is input stops or reduces an amount of power supply to at least the control unit 11, for example.

At time t21 illustrated in FIG. 5D, that is, immediately after the power control unit 17 stops power supply to the control unit 11 or reduces the power supply amount, for example, the control unit 11 is set to an idle state or a sleep state. That is, the detection device 10 is set to a power off state or a sleep state at time t21 illustrated in FIG. 5D.

2-4. Attachment of Repeater

Figure 6A:
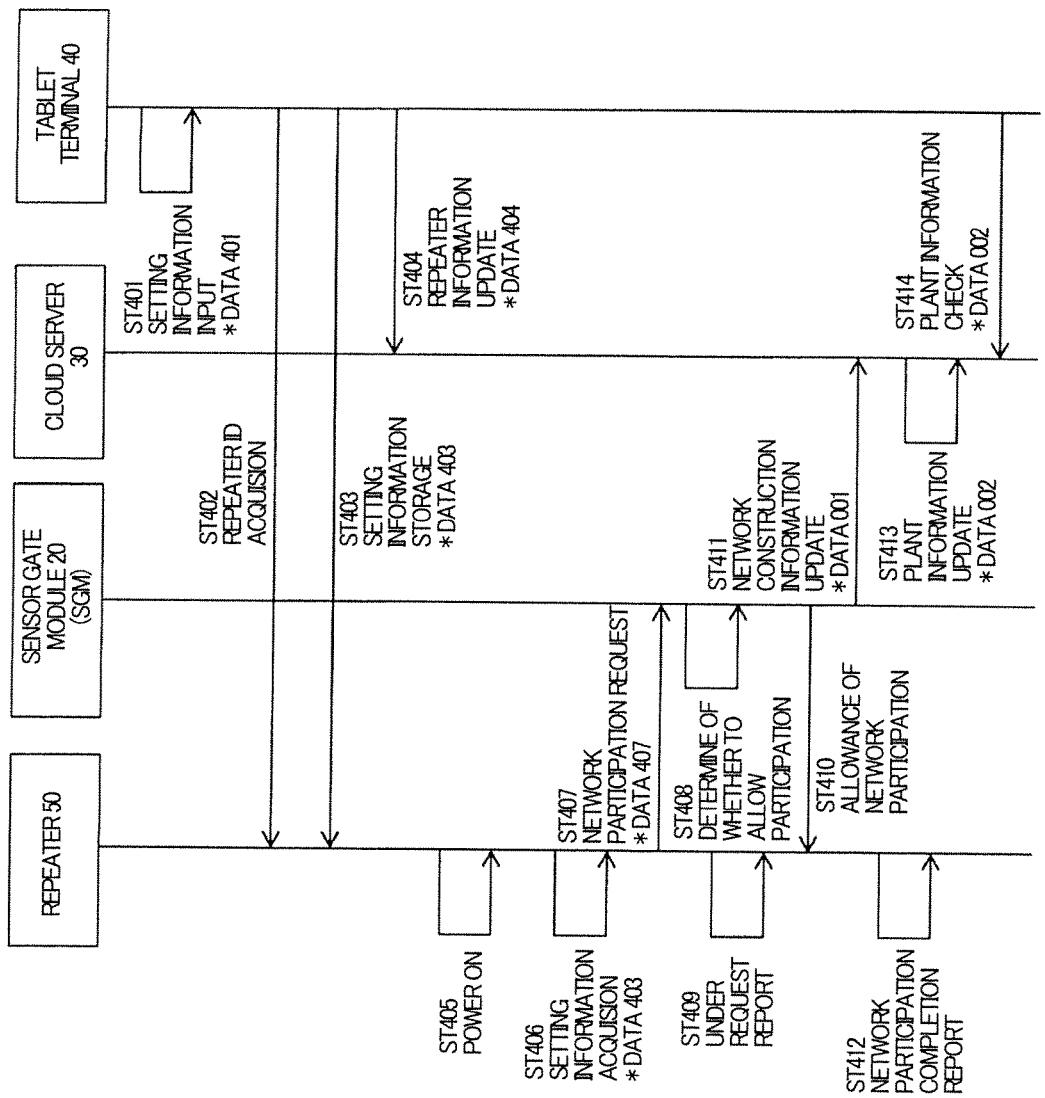
FIG. 6A is a flowchart illustrating an example of work of attaching a repeater illustrated in FIG. 1.

An example of work of attaching the repeater 50 in the plant is described with reference to FIGS. 6A and 6B. The work of attaching the repeater 50 in the plant is performed when the sensor module 10 attached to the plant equipment is not connected to the WSN even after enough time elapses after step ST204 of "2-2. Attachment of Detection Device (Sensor Gate Module)," for example. That is, the work of attaching the repeater 50 in the plant is performed instead of the work described in "2-3. Attachment Cancellation of Detection Device (Sensor Gate Module)" when the sensor module 10 attached to the plant equipment is not connected to the network even after enough time elapses, for example.

An example of work of attaching the repeater 50 in the plant is substantially the same as that of the work described in "2-2. Attachment of Detection Device (Sensor Gate Module)." Therefore, a difference from the work described in "2-2. Attachment of Detection Device (Sensor Gate Module)" is described here, and description is omitted about the same matters as those of the work described in "2-2. Attachment of Detection Device (Sensor Gate Module)."

Step ST401 corresponds to step ST201 illustrated in FIG. 4A. However, in data 401 illustrated in FIG. 6B which is data input in step ST401, data corresponding to the SM operation condition of the data 201 illustrated in FIG. 4B does not exist. This is because since the repeater 50 includes no detection unit, setting about detection of the states of the plant equipment is unnecessary. In the data 401, data corresponding to attachment equipment of the SM attachment information of the data 201 does not exist. This is because since the repeater 50 does not detect the state of the plant equipment, it is unnecessary for the repeater 50 to be attached to the plant equipment. Hereinafter, in a data structure illustrated in FIG. 6B, the data corresponding to the SM operation condition illustrated in FIG. 4B, and the data corresponding to the attachment equipment of the SM attachment information do not exist for the same reason.

Step ST402 corresponds to step ST202 illustrated in FIG. 4A. Step ST403 corresponds to step ST203 illustrated in FIG. 4A. However, in data 403 illustrated in FIG. 6B which is data stored in step ST403, data corresponding to the SM operation condition of data 203 illustrated in FIG. 4B does not exist.

Step ST404 corresponds to step ST204 illustrated in FIG. 4A. However, in data 404 illustrated in FIG. 6B which is data transmitted in step ST404, data corresponding to the SM operation condition of the data 204 illustrated in FIG. 4B, and data corresponding to the attachment equipment of the SM attachment information do not exist.

Step ST405 corresponds to step ST205 illustrated in FIG. 4A. Step ST406 corresponds to step ST206 illustrated in FIG. 4A. Step ST407 corresponds to step ST207 illustrated in FIG. 4A. Step ST408 corresponds to step ST208 illustrated in FIG. 4A. Step ST409 corresponds to step ST209 illustrated in FIG. 4A. Step ST410 corresponds to step ST210 illustrated in FIG. 4A. Step ST411 corresponds to step ST211 illustrated in FIG. 4A. Step ST412 corresponds to step ST212 illustrated in FIG. 4A. Step ST413 corresponds to step ST213 illustrated in FIG. 4A. Step ST414 corresponds to step ST214 illustrated in FIG. 4A.

As described above, the work of attaching the repeater 50 in the plant is substantially the same as the work described in "2-2. Attachment of Detection Device (Sensor Gate Module)." Therefore, also in the work of attaching the repeater 50 in the plant, effects equivalent to those described in "2-2. Attachment of Detection Device (Sensor Gate Module)" can be obtained. Therefore, in the plant equipment state gathering system 1, the work of attaching the repeater 50 in the plant is simplified.

2-5. Occurrence of Abnormal State

An example of an operation upon occurrence of an abnormal state in the states of the plant equipment is described with reference to FIGS. 7A, 7B, 7C, 7D, 7E, 7F, 7G, and 7H. The operation upon occurrence of an abnormal state in the states of the plant equipment gathered in "2-1. Gathering of States of Plant Equipment," for example, is started when an abnormal state occurs in the states of the plant equipment. Occurrence of an abnormal state in the states of the plant equipment is found by the manager of the plant who is viewing the plant information (data 002) stored in the cloud server 30 using an unillustrated laptop computer, for example. The manager who has found the occurrence of the abnormal state in the states of the plant equipment instructs the operator carrying the tablet terminal 40 to perform repair work and so forth, for example.

In step ST501, the operator acquires the plant information (data 002) using the tablet terminal 40. FIG. 7C illustrates an example of the touch panels 45 and 46 of the tablet terminal 40 when the plant information (data 002) is acquired using the plant application. In the example illustrated in FIG. 7C, "Abnormal" is displayed in the column of the sensor module 10 specified by sensor ID:01234567 connected to Network ID:1577.

In step ST502, the operator selects the sensor module 10 in which an abnormal state is detected (an abnormal state occurrence target SM). In the example illustrated in FIG. 7C, the operator selects the sensor module 10 specified by sensor ID:01234567.

In step ST503, the operator acquires the sensor ID by holding the tablet terminal 40 over the sensor module 10. FIG. 7D illustrates an example of the touch panels 45 and 46 of the tablet terminal 40 when the sensor module 10 specified by sensor ID:01234567 is selected in the example illustrated in FIG. 7C. In the example illustrated in FIG. 7D, "Detected value of sensor 1 is abnormal." is displayed, indicating that a detected value of the temperature on the high temperature side which is one of the detection items is abnormal.

In the example illustrated in FIG. 7D, attachment information of the sensor module 10 in which an abnormal state is detected is displayed. The attachment area of the attachment information illustrated in the example illustrated in FIG. 7D is position information on the tablet terminal 40 at the time of setting input acquired by the position information acquisition unit 44 of the tablet terminal 40 in step ST201 of "2-2. Attachment of Detection Device (Sensor Gate Module)," for example. Therefore, the operator can easily recognize the position to which the sensor module 10 in which an abnormal state is detected is attached.

In the example illustrated in FIG. 7D, "Hold tablet over target SM." is displayed. In this state, the operator holds the tablet terminal 40 over the sensor module 10, whereby the sensor ID stored in the tag unit 14 of the sensor module 10 can be automatically acquired by the tag control unit 43 of the tablet terminal 40.

In step ST504, the control unit 41 of the tablet terminal 40 determines whether the sensor ID of the sensor module 10 selected in step ST502 and the sensor ID acquired in step ST503 match each other. If the sensor ID of the sensor module 10 selected in step ST502 and the sensor ID acquired in step ST503 do not match each other, an example illustrated in FIG. 7E is displayed on the touch panels 45 and 46 of the tablet terminal 40, for example. The example illustrated in FIG. 7E indicates that the sensor ID of the sensor module 10 selected in step ST502 and the sensor ID acquired in step ST503 do not match each other. Therefore, the operator does not perform the repair work and so forth with respect to the plant equipment to which the sensor module 10 over which the tablet terminal 40 is held in step ST503 is attached. When the example illustrated in FIG. 7E is displayed on the touch panels 45 and 46 of the tablet terminal 40, the operator holds the tablet terminal 40 over the sensor module 10, whereby the sensor ID of the sensor module 10 can be acquired and determination in step ST504 is made again.

Figures 7A, 7B:
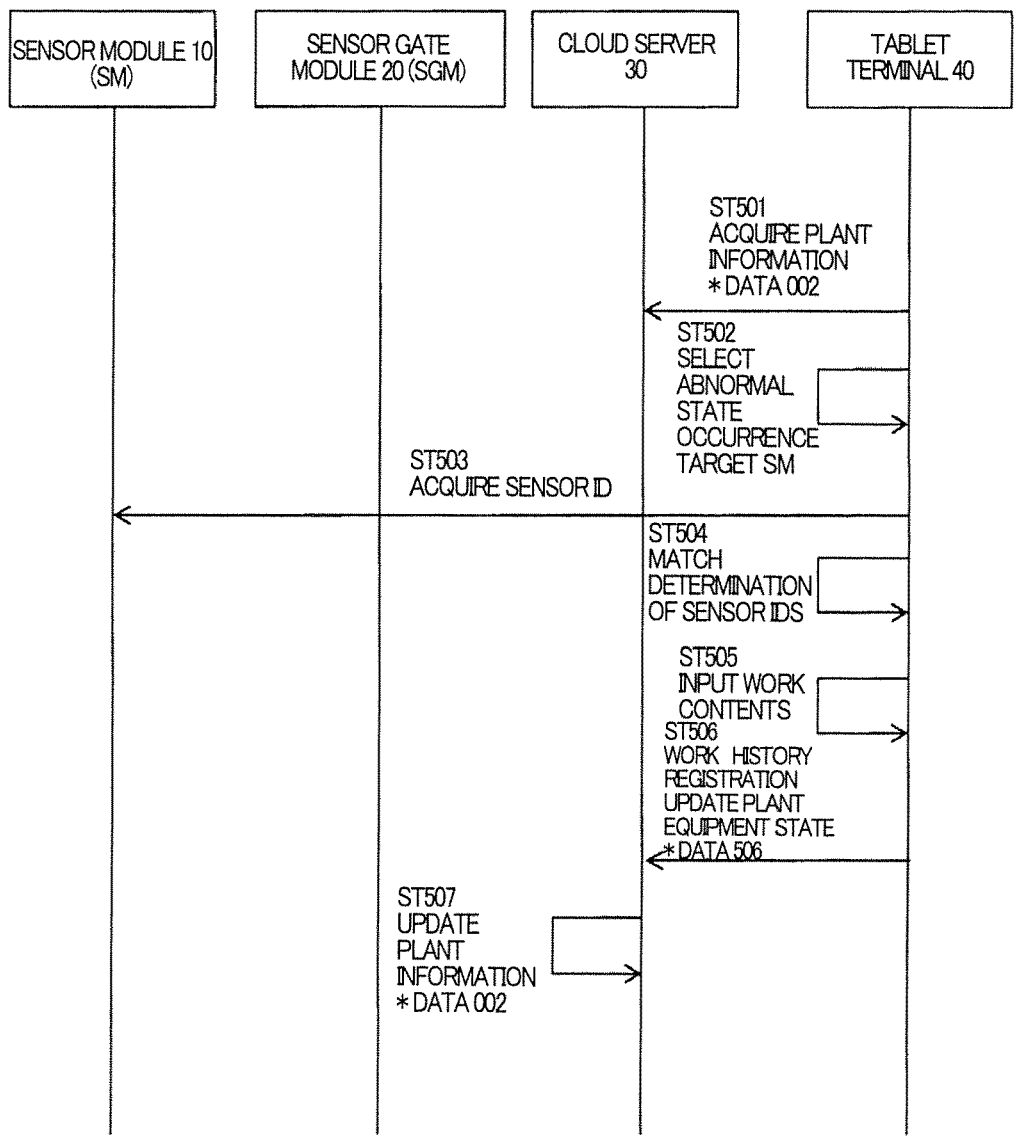
FIG. 7A is a flowchart illustrating an example of an operation upon occurrence of an abnormal state in states of plant equipment gathered in the operation illustrated in FIG. 3A.
FIG. 7B is a diagram illustrating an example of a data structure used in the operation illustrated in FIG. 7A.
Figure 7C:
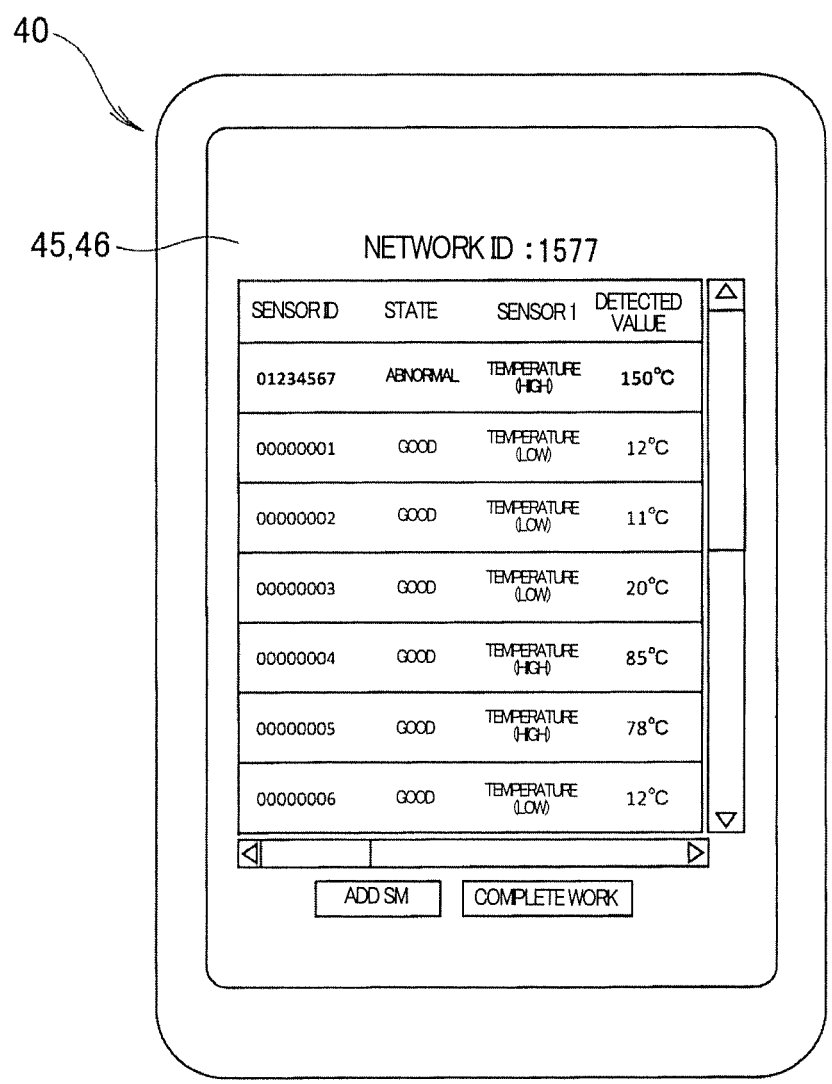
FIG. 7C is a diagram illustrating a display example of the display unit of the mobile terminal illustrated in FIG. 1 in the operation illustrated in FIG. 7A.
Figure 7D:
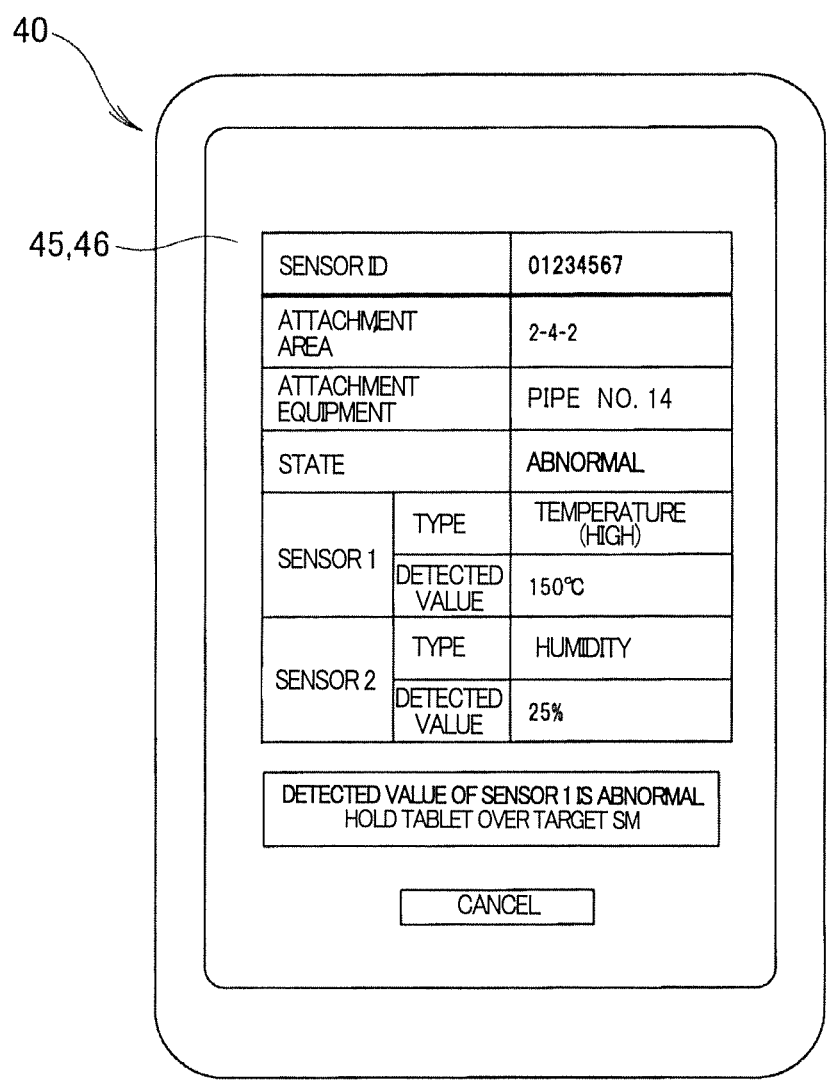
FIG. 7D is a diagram illustrating a display example of the display unit of the mobile terminal illustrated in FIG. 1 in the operation illustrated in FIG. 7A.
Figure 7E:
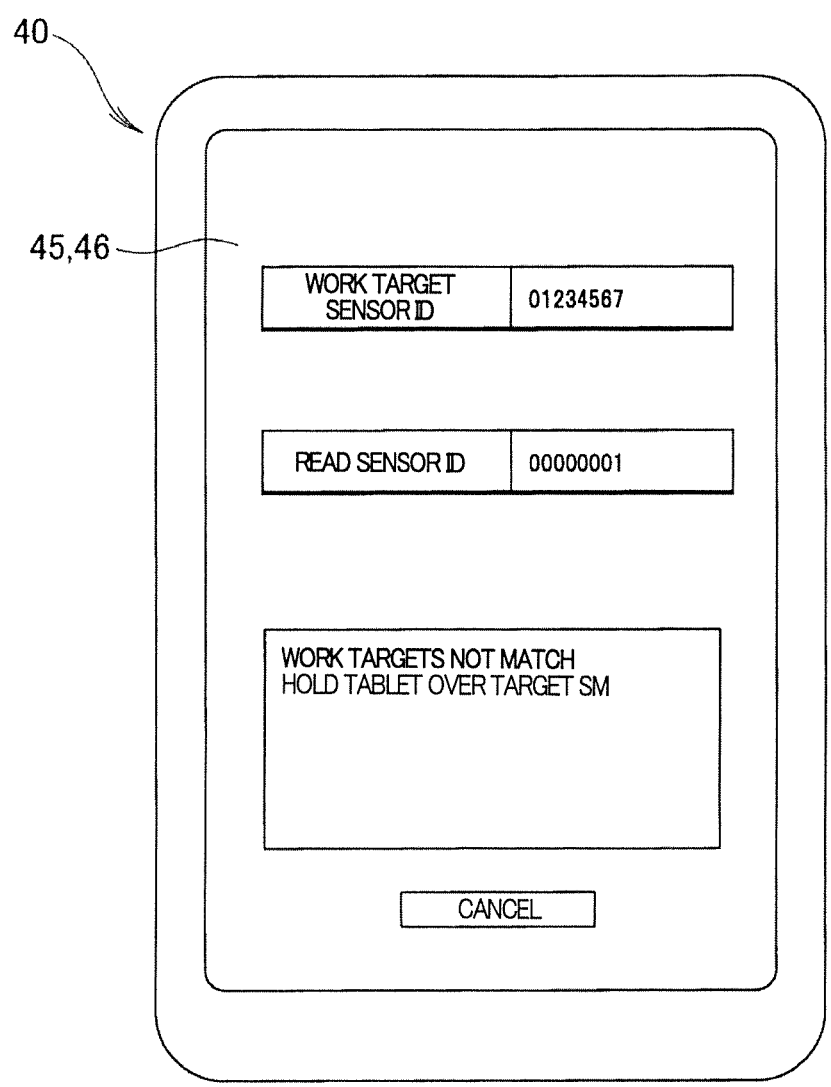
FIG. 7E is a diagram illustrating a display example of the display unit of the mobile terminal illustrated in FIG. 1 in the operation illustrated in FIG. 7A.
Figure 7F:
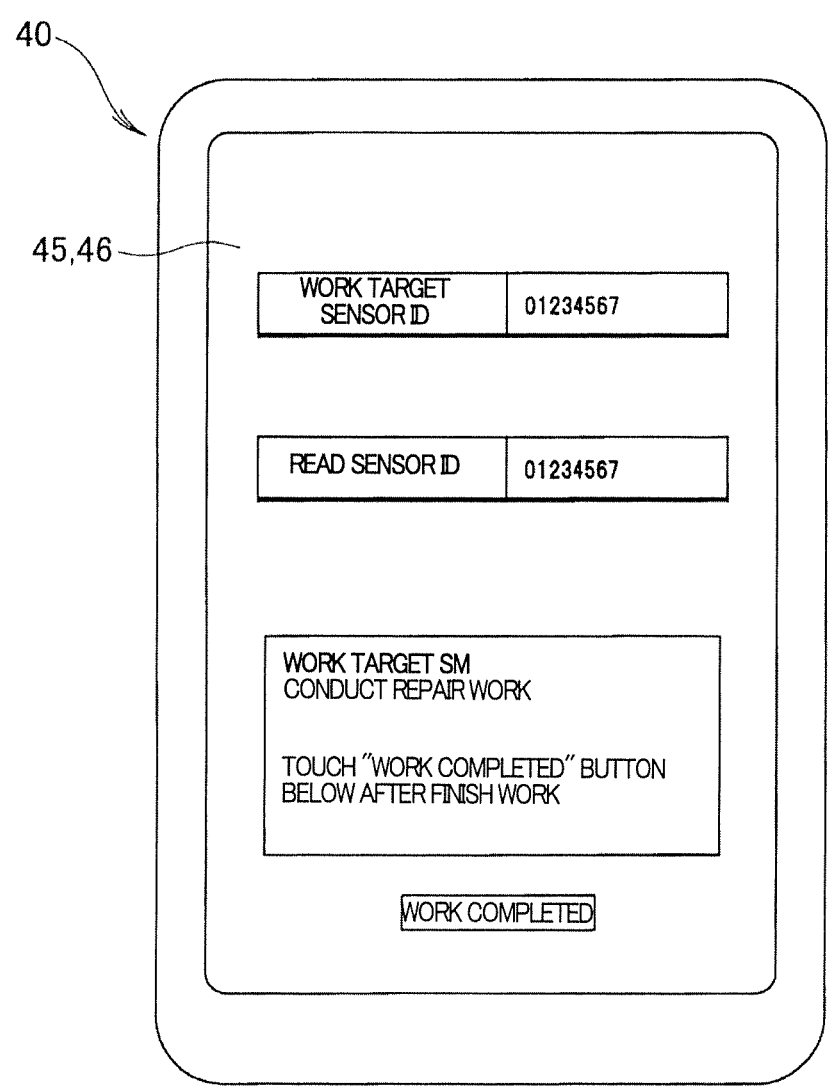
FIG. 7F is a diagram illustrating a display example of the display unit of the mobile terminal illustrated in FIG. 1 in the operation illustrated in FIG. 7A.

On the other hand, if the sensor ID of the sensor module 10 selected in step ST502 and the sensor ID acquired in step ST503 match each other, the example illustrated in FIG. 7F is displayed on the touch panels 45 and 46 of the tablet terminal 40, for example. If the example illustrated in FIG. 7F is displayed, it can be checked that the sensor module 10 over which the operator holds the tablet terminal 40 is the sensor module 10 in which an abnormal state is detected. Therefore, the operator can perform the repair work and so forth of the plant equipment to which this sensor module 10 is attached. The operator touches "Work completed" in the example illustrated in FIG. 7F when the repair work and so forth of the plant equipment is completed.

In step ST505, the operator operates the tablet terminal 40 and inputs work contents. In the example illustrated in FIG. 7F, when "Work completed" is touched, an example illustrated in FIG. 7G is displayed on the touch panels 45 and 46 of the tablet terminal 40. In the example illustrated in FIG. 7G, a space in which the operator inputs work contents, such as the repair work, of the plant equipment which the operator performed in text, and a column in which the operator inputs the state of the plant equipment after performing the repair work and so forth of the plant equipment by selecting from a list are displayed. When the operator touches "Register" in the example illustrated in FIG. 7G after completing the input, the process proceeds to step ST506.

In step ST506, the tablet terminal 40 transmits the work contents input in step ST505 and the states of the plant equipment to the cloud server 30. Data transmitted in step ST506 is data 506 illustrated in FIG. 7B.

Figure 7H:
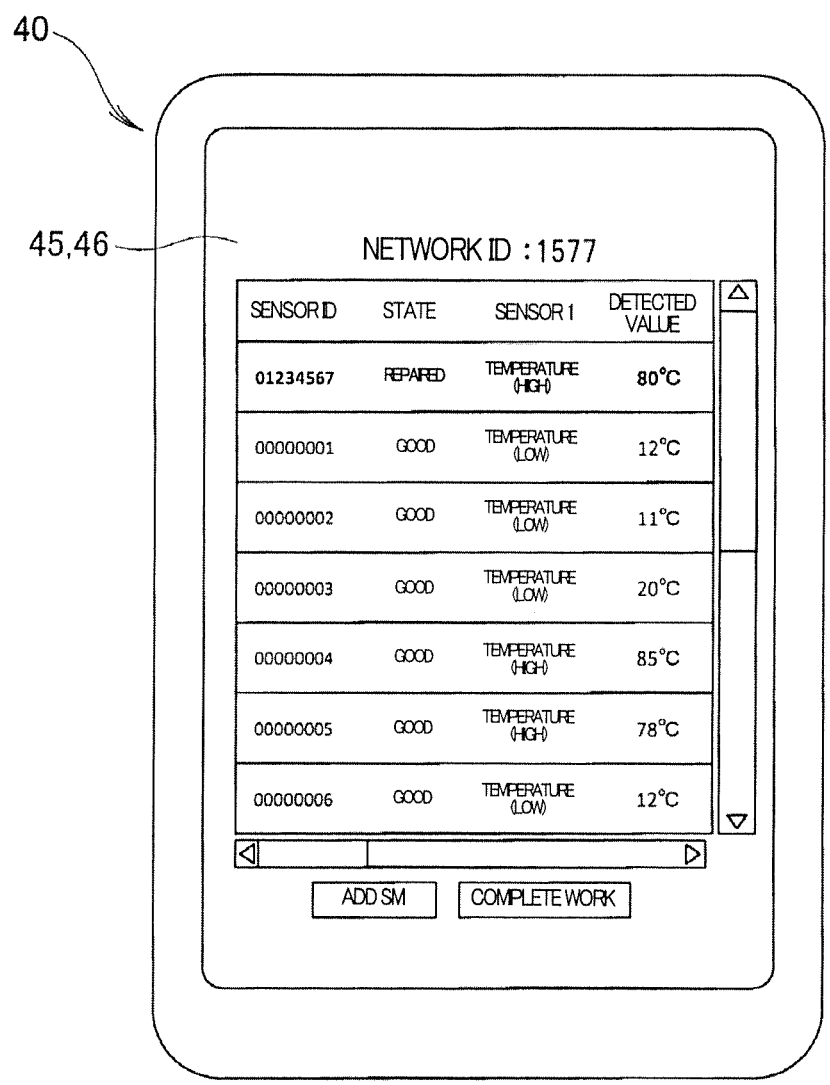
FIG. 7H is a diagram illustrating a display example of the display unit of the mobile terminal illustrated in FIG. 1 in the operation illustrated in FIG. 7A.

In step ST507, the cloud server 30 makes the received data 506 reflected on the plant information (data 002) stored in the storage unit 33 of the cloud server 30. When the operator checks the plant information (data 002) after reflection of the data 506 on the plant information (data 002) is completed in step ST507, an example illustrated in FIG. 7H is displayed on the touch panels 45 and 46 of the tablet terminal 40. In the example illustrated in FIG. 7H, "Repaired" is displayed in a column of the sensor module 10 specified by sensor ID:01234567 which is the sensor module 10 attached to the plant equipment for which the operator performed the repair work and so forth.

In the example illustrated in FIG. 7H, for example, the operator makes a completion report of the work to the manager after checking "Repaired." The manager who received the completion report of the work can view the plant information (data 002) stored in the cloud server 30 using an unillustrated laptop computer and check that the occurred abnormal state has been eliminated.

In the operation upon occurrence of an abnormal state in the states of the plant equipment, the plant equipment state gathering system 1 determines whether the sensor ID of the sensor module 10 selected by the operator and the sensor ID of the sensor module 10 over which the operator holds the tablet terminal 40 match each other. Therefore, it can be checked that the plant equipment requires repair work and so forth before the operator performs repair work and so forth of the plant equipment. As a result, performing unnecessary work by mistake to plant equipment which requires no repair work and so forth can be prevented.

2-6. Occurrence of Abnormal State (Modified Example)

Figure 8A:
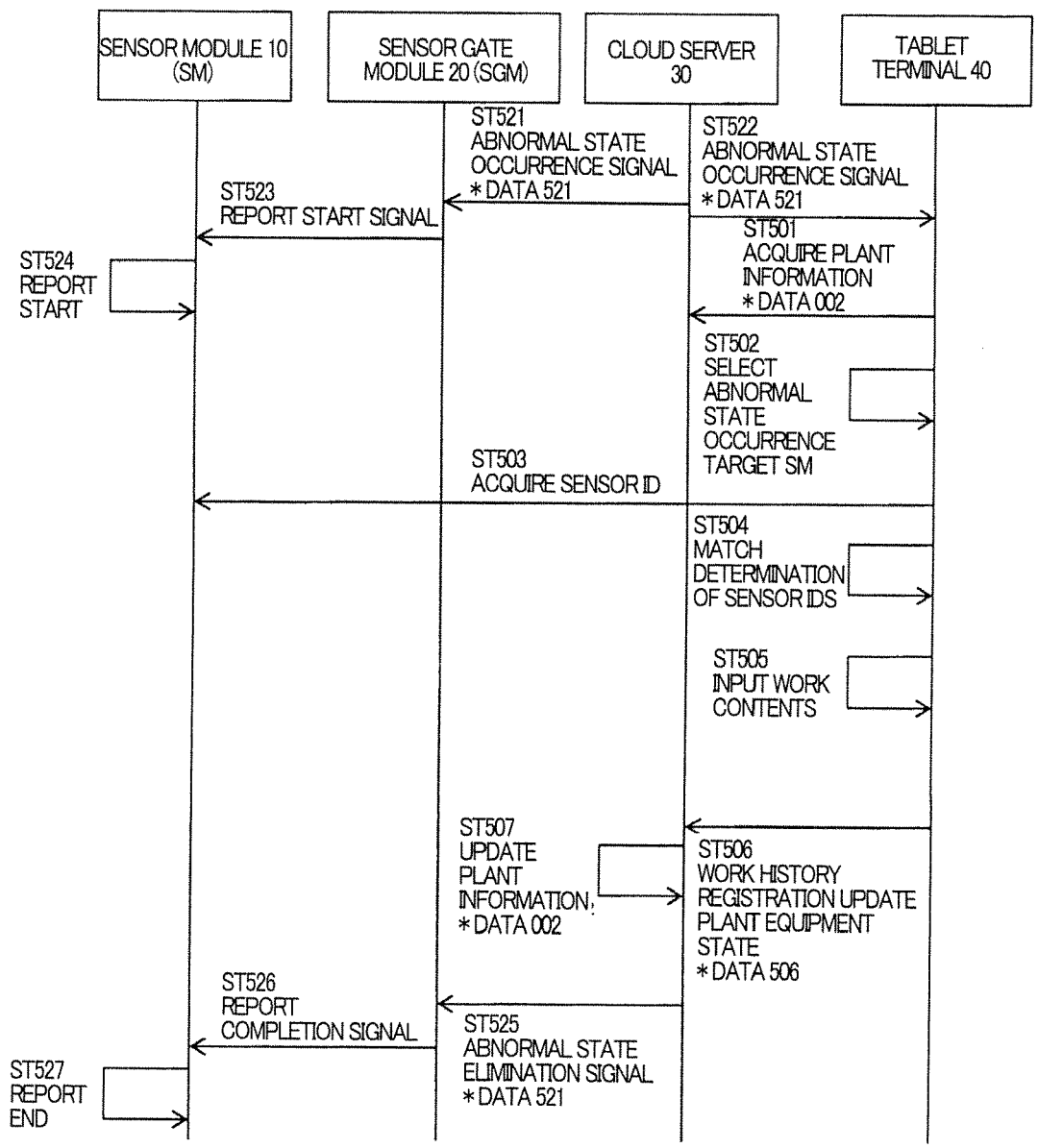
FIG. 8A is a flowchart illustrating a modified example of the operation illustrated in FIG. 7A.
Figure 8B:
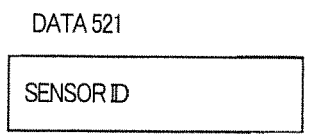
FIG. 8B is a diagram illustrating an example of a data structure used in the operation illustrated in FIG. 8A.

With reference to FIGS. 8A and 8B, a modified example of the operation upon occurrence of an abnormal state in the states of the plant equipment described in "2-5. Occurrence of Abnormal State" is described. The modified example of the operation upon occurrence of an abnormal state in the states of the plant equipment is described only in a difference from the operation upon occurrence of an abnormal state in the states of the plant equipment described in "2-5. Occurrence of Abnormal State." In the modified example of the operation upon occurrence of an abnormal state in the states of the plant equipment, seven steps of step ST521, step ST522, step ST523, step ST524, step ST525, step ST526, and step ST527 are added to the flowchart illustrated in FIG. 7A. In the modified example of the operation upon occurrence of an abnormal state in the states of the plant equipment, the cloud server 30 determines or monitors whether an abnormal state has occurred in the states of the plant equipment.

In step ST521, upon determining that an abnormal state has occurred in the states of the plant equipment, the cloud server 30 transmits an abnormal state occurrence signal to a sensor gate module 20 which constructs a WSN to which the sensor module 10 in which an abnormal state is detected is connected. The abnormal state occurrence signal includes data 521 illustrated in FIG. 8B, that is, the sensor ID of the sensor module 10 in which an abnormal state is detected.

In step ST522, the cloud server 30 transmits the abnormal state occurrence signal also to the tablet terminal 40. The sensor ID of the sensor module 10 in which an abnormal state is detected is included also in the abnormal state occurrence signal transmitted to the tablet terminal 40. Occurrence of an abnormal state in the states of the plant equipment and the sensor ID of the sensor module 10 in which an abnormal state is detected may be displayed, for example, on the touch panels 45 and 46 of the tablet terminal 40 which received the abnormal state occurrence signal. The operator who carries the tablet terminal 40 which received the abnormal state occurrence signal performs the operation along the flowchart from step ST501 as described in "2-5. Occurrence of Abnormal State," for example.

In step ST523, the sensor gate module 20 which received the abnormal state occurrence signal transmitted in step ST521 transmits a report start signal to the sensor module 10 specified by the sensor ID included in the abnormal state occurrence signal.

In step ST524, the control unit 11 of the sensor module 10 which received the report start signal starts the report unit 15, and starts the report of occurrence of the abnormal state. The control unit 11 of the sensor module 10 reports that an abnormal state has occurred by turning an LED on, for example.

If the plant information (data 002) is updated in step ST507 and the occurred abnormal state is eliminated, the process proceeds to step ST525. In step ST525, the cloud server 30 transmits an abnormal state elimination signal to the sensor gate module 20 to which the cloud server 30 transmitted the abnormal state occurrence signal in step ST521. The abnormal state elimination signal includes data 521 illustrated in FIG. 8B, that is, the sensor ID of the sensor module 10 in which an abnormal state is detected.

In step ST526, the sensor gate module 20 which received the abnormal state elimination signal transmits a report completion signal to the sensor module 10 specified by the sensor ID included in the abnormal state elimination signal.

In step ST527, the control unit 11 of the sensor module 10 which received the report completion signal stops the report unit 15, and completes the report of occurrence of the abnormal state. For example, the control unit 11 of the sensor module 10 completes the report of occurrence of the abnormal state by turning off the LED.

In the modified example of the operation upon occurrence of an abnormal state in the states of the plant equipment, the report unit 15 of the sensor module 10 is started in the plant equipment state gathering system 1 upon occurrence of an abnormal state in the states of the plant equipment. Therefore, the operator can easily find the plant equipment in which an abnormal state is occurring.

In the modified example of the operation upon occurrence of an abnormal state in the states of the plant equipment, the cloud server 30 transmits the abnormal state occurrence signal to the tablet terminal 40 upon occurrence of an abnormal state in the states of the plant equipment. Therefore, the operator carrying the tablet terminal 40 can promptly recognize that an abnormal state has occurred in the states of the plant equipment.

The modified example of the operation upon occurrence of an abnormal state in the states of the plant equipment does not necessarily have to be provided with all of the step ST521, step ST522, step ST523, step ST524, step ST525, step ST526, and step ST527 added in FIG. 8A to FIG. 7A. For example, only step ST522 may be added to FIG. 7A. On the contrary, for example, steps other than step ST522 may be added to FIG. 7A.

The present invention is not limited to the illustrative embodiments described above, and those skilled in the art could easily modify the illustrative embodiments described above within the scope of the claims.

INDUSTRIAL APPLICABILITY

The present invention is suitable for a plant equipment state gathering system.

DESCRIPTION OF REFERENCE NUMERALS

1 . . . Plant equipment state gathering system
10 . . . Detection device
11 . . . Control unit of detection device
12 . . . Detection unit of detection device
13 . . . Network connection unit of detection device
14 . . . Tag unit of detection device
15 . . . Report unit 20 . . . Network construction device
30 . . . Data storage device
33 . . . Storage unit of data storage device
40 . . . Mobile terminal
43 . . . Tag control unit
44 . . . Position information acquisition unit
50 . . . Repeater

The invention claimed is:

1. A plant equipment state gathering system, comprising:
a detection device, a mobile terminal, a network construction device, and a data storage device,
wherein the mobile terminal includes a tag control unit, the tag control unit contactlessly transmitting, to the detection device, network information for connecting the detection device to a network, the network being constructed by the network construction device,
wherein the detection device includes:
a detection unit detecting a state of plant equipment disposed in a plant,
a tag unit contactlessly receiving, from the mobile terminal, the network information and storing the received network information,
a network connection unit connecting the detection device to the network based on the received network information, and
wherein the detection device and at least transmits, to the network construction device via the network, 1) the detected state of the plant equipment and 2) specifying information for specifying the detection device,
wherein the data storage device 1) receives, from the network construction device, the state of the plant equipment and the specifying information of the detection device and 2) stores the received state of the plant equipment and the specifying information of the detection device,
wherein the detection device further includes a battery,
wherein a first amount of power is supplied to the detection device while the network information is stored in the tag unit of the detection device,
wherein a second amount of power is supplied to the detection device when the network information is not stored in the tag unit of the detection device, the second amount of power being smaller than the first amount of power, and
wherein the second amount of power supplied to the detection device when a network participation completion report is issued by the network construction device.

2. The plant equipment state gathering system according to claim 1, wherein
the tag unit of the detection device stores the specifying information of the detection device,
the tag control unit of the mobile terminal contactlessly and automatically acquires the specifying information from the tag unit of the detection device, and
after the tag control unit of the mobile terminal acquires the specifying information from the tag unit of the detection device, the tag control unit of the mobile terminal transmits the network information to the tag unit of the detection device by the tag control unit.

3. The plant equipment state gathering system according to claim 1, wherein
when the tag control unit of the mobile terminal transmits the network information to the tag unit of the detection device, the mobile terminal transmits the specifying information and the network information to the data storage device.

4. The plant equipment state gathering system according to claim 1, wherein
the detection device further includes a report unit,
when the state of the plant equipment stored in the data storage device indicates an abnormal state of the plant equipment;
the data storage device transmits, to the network construction device, an abnormal state occurrence signal including the specifying information of the detection device that detected the abnormal state of the plant equipment,
the network construction device transmits a report start signal to the detection device specified in the specifying information included in the abnormal state occurrence signal, and
the detection device which received the report start signal starts a report process.

5. The plant equipment state gathering system according to claim 2, wherein
when the state of the plant equipment stored in the data storage device indicates an abnormal state of the plant equipment;
the data storage device transmits, to the mobile terminal, an abnormal state occurrence signal including the specifying information of the detection device that detected the abnormal state of the plant equipment to the mobile terminal, and
after receiving the abnormal state occurrence signal, the tag control unit of the mobile terminal determines whether the specifying information of the detection device acquired from the tag unit of the detection device and the specifying information included in the abnormal state occurrence signal match each other.

6. The plant equipment state gathering system according to claim 5, wherein
the detection device further includes a report unit,
when the state of the plant equipment stored in the data storage device indicates an abnormal state of the plant equipment;
the data storage device transmits, to the network construction device, an abnormal state occurrence signal including the specifying information of the detection device that detected the abnormal state of the plant equipment,
the network construction device transmits the report start signal to the detection device specified in the specifying information included in the abnormal state occurrence signal, and
the detection device which received the report start signal starts the report unit.

7. The plant equipment state gathering system according to claim 1, wherein
the mobile terminal acquires current position information of the mobile terminal, and
the acquired current position information is included in the network information as a position at which the detection device is disposed.

* * * * *